(12) United States Patent
Shiraishi et al.

(10) Patent No.: US 6,530,361 B1
(45) Date of Patent: Mar. 11, 2003

(54) COMPRESSION IGNITION ENGINE AND CONTROL METHOD THEREOF

(75) Inventors: Takuya Shiraishi, Hitachinaka (JP); Toshiharu Nogi, Hitachinaka (JP); Minoru Ohsuga, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/611,441

(22) Filed: Jul. 6, 2000

(30) Foreign Application Priority Data

Jul. 6, 1999 (JP) ............................................. 11-191205

(51) Int. Cl.⁷ ................................................. F02M 7/00
(52) U.S. Cl. ........................................ 123/435; 123/305
(58) Field of Search ................................. 123/305, 435, 123/295, 27 R, 90.15, 294

(56) References Cited

U.S. PATENT DOCUMENTS

| 4,883,032 A | * | 11/1989 | Hunter et al. ................ 123/276 |
| 5,836,291 A | * | 11/1998 | Kinugasa et al. ........... 123/679 |
| 6,092,496 A | * | 7/2000 | Bhargava et al. ........ 123/90.15 |
| 6,209,516 B1 | * | 4/2001 | Yamshita ..................... 123/305 |

FOREIGN PATENT DOCUMENTS

JP      10-252541      9/1998

* cited by examiner

*Primary Examiner*—Henry C. Yuen
*Assistant Examiner*—Mahmoud Gimie
(74) *Attorney, Agent, or Firm*—Crowell & Moring LLP

(57) ABSTRACT

A cylinder-inside state (temperature or pressure) after compression inside a combustion chamber of an engine is estimated or detected before occurrence of a combustion phenomenon, an EGR quantity and opening and closing timing of and intake valve are controlled.

13 Claims, 29 Drawing Sheets

INTAKE VALVE CLOSING TIMING (ABDC)

COMPRESSION IGNITION ENGINE AND CONTROL METHOD THEREOF

BACKGROUND OF THE INVENTION

The present invention relates to a control method of a compression ignition type engine and, more particularly, to a control method of optimizing ignition timing at a time of high torque at which a quantity of fuel has increased.

A conventional compression ignition engine is known, which is disclosed in JP A 10-252541 in which ignition is caused in the vicinity of a compression top dead center, avoiding a cold flame region which is caused before hot flame occurs.

However, in the conventional engine, a compression ratio is fixed. Compression ignition engines have a problem that combustion pressure increases rapidly and knocking occurs when torque is large (in the case where a fuel quantity is large and an air fuel ratio is small). This is because auto-ignition occurs earlier than a suitable ignition time and flame has been propagated from that portion as a fire source. In this manner, since the conventional compression ignition engine has not a forcible igniting means such as a spark ignition device, there is a problem that ignition timing at a time of high torque can not be controlled.

SUMMARY OF THE INVENTION

An object of the present invention is to enable timing of compression ignition to be controllable.

In order to achieve the above object, in the present invention, a cylinder-inside state (temperature or pressure) inside an engine combustion chamber after compression is estimated or detected before occurrence of a combustion phenomenon, and a quantity of EGR and timing of intake/exhaust valve opening/closing are controlled so that the cylinder-inside state enters a cold flame region which becomes a trigger of compression ignition phenomenon.

Concretely, there are provided a valve mechanism including an intake valve and an exhaust valve each incorporated with an engine cylinder, a fuel injection valve having an injection port opened inside a combustion chamber surrounded by a piston and a cylinder wall of the engine, operation state detecting means for detecting operation states of the engine, air fuel ratio setting means for setting air fuel ratios, cylinder-inside state estimating means for estimating temperature or pressure inside the cylinder and cylinder-inside state controlling means for controlling temperature or pressure inside the cylinder, and the cylinder-inside state controlling means controls so that the cylinder-inside temperature or pressure in the vicinity of the compression top dead center passes through a cold flame region which is an ignition range of fuel expressed by relations of temperature and pressure, based on the estimation results estimated by the cylinder-inside state estimating means.

Further, concretely, in the present invention, there is the following feature. That is, when the nature of gasoline (for example, regular gasoline or high octane gasoline) is determined, a limit of ignition by compression is determined in a relation between a cylinder-inside pressure (which changes depending on the position of a piston) and a temperature of a gaseous mixture (refer to FIG. 4B and FIG. 8). In a region 43 of a prescribed temperature and pressure state, pre-combustion (cold flame) which does not directly influence on torque generation occurs. In the present invention, an air fuel ratio is controlled so that the cold flame is generated prior to combustion (hot flame) which directly influence on torque generation.

It is a matter of course that it is possible to generate the cold flame prior to combustion (hot flame) which directly influences on torque generation by controlling cylinder-inside pressure or cylinder-inside temperature under the condition that an air fuel ratio is fixed to a prescribed value.

Further, "cold flame" also is called "cool flame" or "low temperature flame".

DESCRIPTION OF EMBODIMENTS OF THE INVENTION

Figure 1:
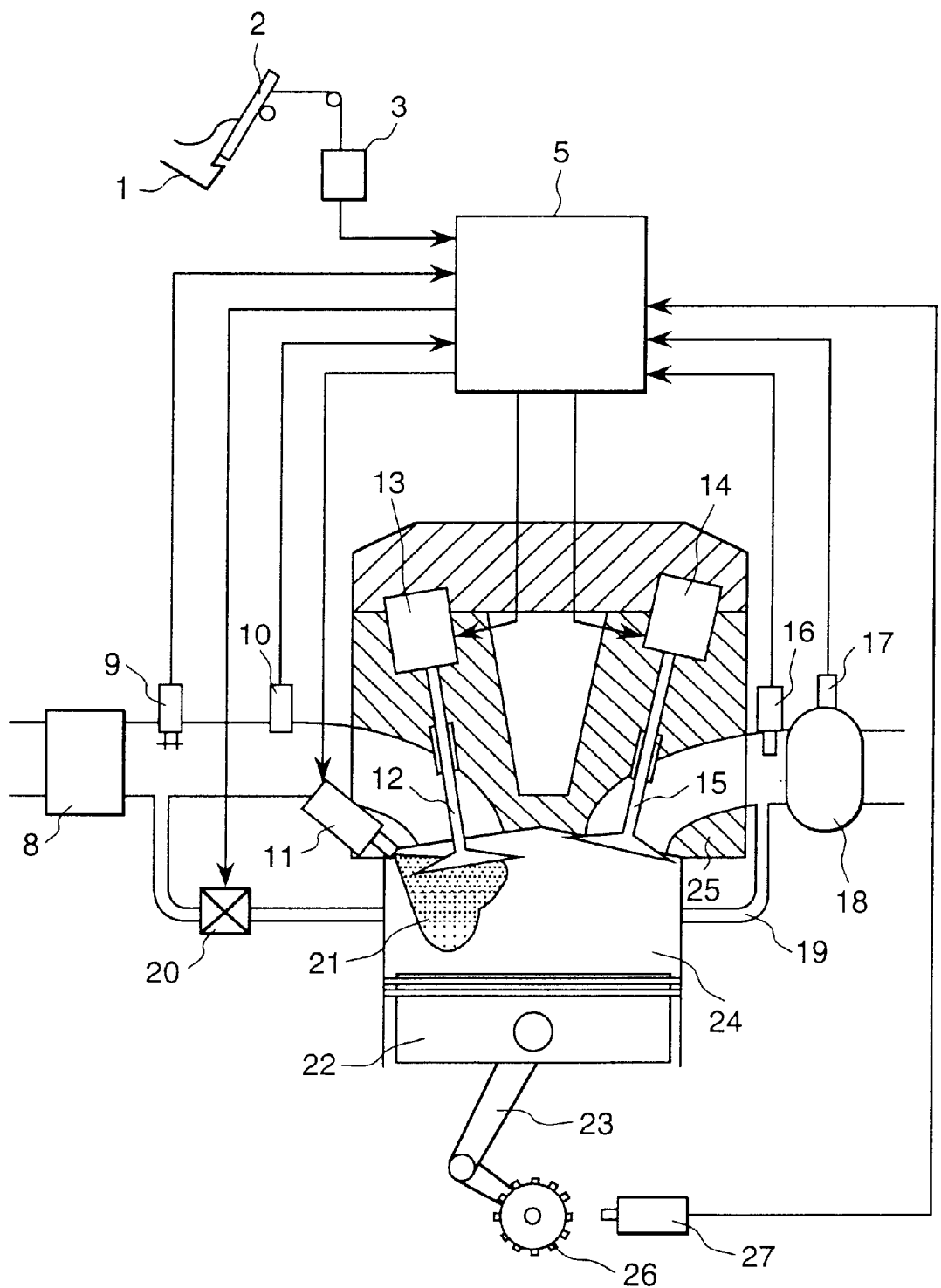
FIG. 1 is a schematic diagram of a compression ignition type direct injection engine employing the present invention.

Embodiments of the present invention will be described hereunder, referring to the drawings.

An engine shown in FIG. 1 is provided with a crank mechanism 23, and a combustion chamber 24 is formed by a piston 22 connected to the crank mechanism 23 and an engine head. The combustion chamber 24 is air-tightly closed by an intake valve 12, an exhaust valve 15 and a fuel injection valve 11, each mounted in the engine head 25. The intake valve 12 and the exhaust valve 15 are moved by variable valve mechanisms 13 and 14, respectively. The engine takes air necessary for combustion into the combustion chamber 24 by reciprocation of the piston 22. The air to be taken in the engine has dusts in the air removed by an air cleaner 8 and an intake air flow rate measured by an air flow meter 9. A control unit 5 controlling the engine detects an engine operation state on the basis of signals from various kinds of sensors, and controls the variable valve mechanisms 13, 14, an EGR valve 20 and the fuel injection valve 11, each mounted on the engine, based on the detection results. Operation quantities of an accelerator pedal 2 operated by a driver 1 of the vehicle mounting the engine are converted into electric signals and input into the control unit 5.

Figure 2:
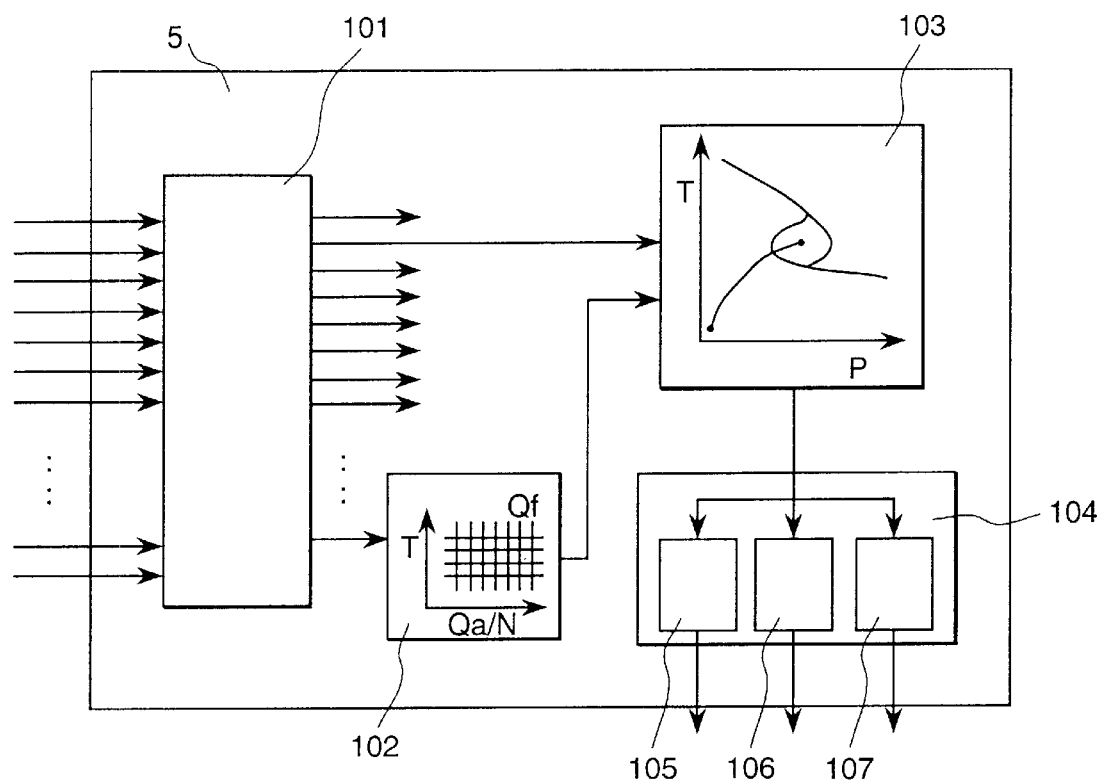
FIG. 2 is a block diagram of a control unit in the present invention.

A construction of the control unit 5 is shown in FIG. 2. Signals from the various kinds of sensors, such as engine speed or revolution numbers, intake air pressure, intake air temperature, water temperature, an accelerator pedal operation quantity, an intake air flow rate, fuel compositions, etc. are input into an operation state detecting means 101. As the other input signals, there is a signal from a crank angle sensor 26, 27 mounted on a crankshaft 23, a signal from an air fuel ratio sensor 16 mounted inside an exhaust pipe, a signal from a temperature sensor 17 detecting the temperature of exhaust catalyst, etc., for instance. An air fuel ratio setting means 102 sets a fuel ratio no the basis of at least one of signals from the operation state detecting means 101. Further, the operation state detecting means 101 determines an occurrence region of cold flame which is memorized in the control unit 5 in advance, on the basis of information from a fuel composition sensor. A cylinder-inside state controlling means 103 estimates pressure and temperature in the vicinity of an upper dead center of compression of the engine on the basis of at least one of signals from the operation-state detecting means 101 and an air fuel ratio set by the air fuel ratio setting means. A control signal is input into the cylinder-inside state controlling means 104 so that the estimation results passes through the cold flame region. The inside of the cylinder-inside state controlling means 104 is composed of an EGR controlling means 105, a variable valve controlling means 106 and a fuel injection controlling means 107. The EGR controlling means 105 outputs a control signal to the EGR valve 20 to change a quantity of EGR. The variable valve controlling means 106 outputs a control signal to the variable valve mechanism 13 operating the intake valve 12. The Fuel injection controlling means 107 outputs a control signal to the fuel injection valve 11 to adjust a fuel injection quantity and injection timing.

Figure 3:
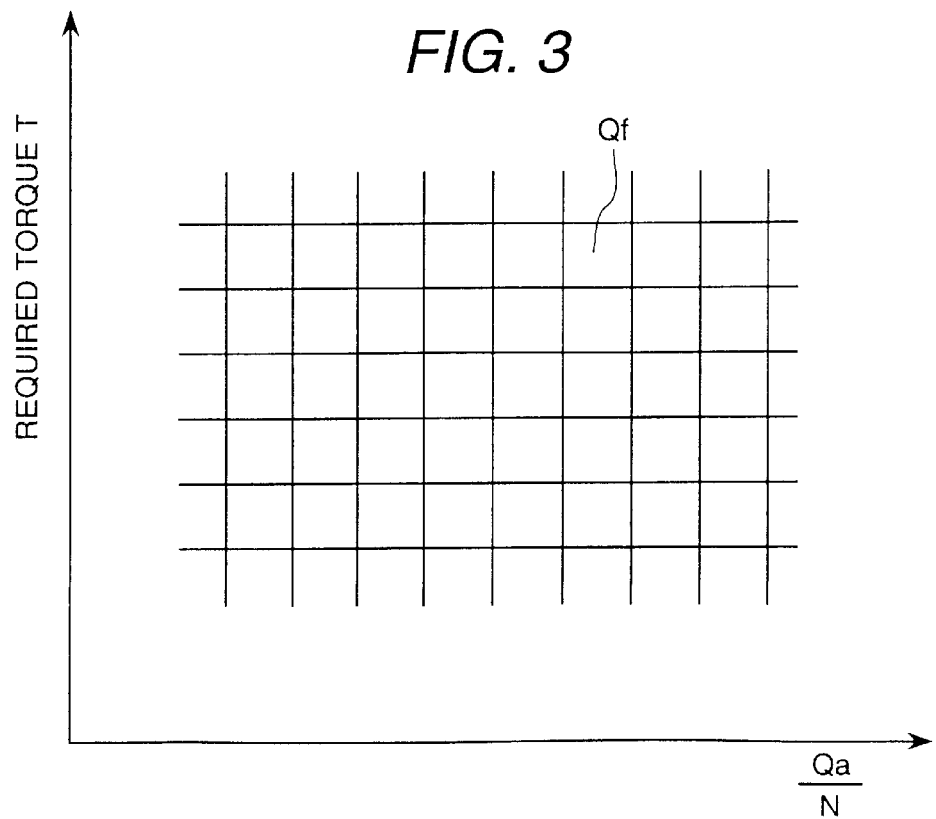
FIG. 3 is an illustration for explanation of an air fuel ratio setting method.

FIG. 3 is a graph for explaining a method of setting air fuel ratios by the air fuel ratio setting means 102. The air fuel setting means 102 determines a fuel injection quantity Qf, using information of an intake air flow rate, engine revolution numbers, required engine torque, of the operation state detecting means 101. The required engine torque T can be obtained from an accelerator operation quantity inside the operation-state detecting means 101. Air fuel ratios are calculated as ratios between intake air quantities Qa and fuel injection quantities Qf.

Figure 4A:
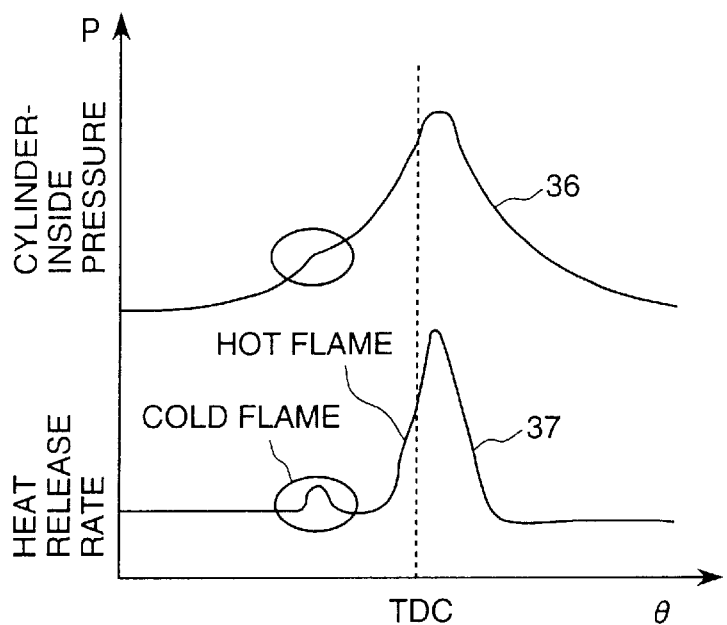
FIG. 4A is an illustration showing a cylinder-inside pressure wave-shape and heat release rate wave shape which are representative for the compression ignition type engine.

FIG. 4A shows cylinder-inside pressure and a heat release rate during compression ignition combustion. A reference number 36 denotes a wave shape formed by change in pressure inside the combustion chamber of an engine, measured by a cylinder-inside pressure sensor. A reference number 37 shows heat release rates obtained from the wave shape 36. In the compression ignition engine, since the ignition is not forcible by a spark plug, the timing that ignition occurs is not definite. A change occurs in pressure wave shape in the vicinity of a circle drawn on the wave shape curve 36. Viewing from the heat release rate curve 37, the heat release-rate increases at that time, whereby it is found that heat release occurs. The heat release is called a cold flame, and large heat release occurred after that is called a hot flame. It is essential for normal compression ignition combustion that the cold flame is generated, and when a cold flame is generated, the combustion is shifted to a hot flame reaction after generation of cold flame, which.can be said that the cold flame reaction serves as a role of a fire source. In an ignition combustion system by a spark plug, a cold flame is not measured but only a hot flame is measured. That is, in this case, ignition by the spark plug becomes a fire source and a hot flame reaction is caused thereby. However, such a cold flame is generated at an air fuel ratio of about 80–25, and when the air fuel ratio becomes smaller than that value, that is, a fuel quantity increases, a hot flame reaction occurs before the cold flame is generated. The hot flame reaction is not normal compression ignition combustion but a phenomenon close to knocking. A limit at a high torque side of a compression ignition engine is restricted by this knocking phenomenon. This is because ignition timing when a fuel quantity increases can not be properly controlled. A point of the present invention is that ignition timing can be properly controlled even at a time of high torque.

Figure 4B:
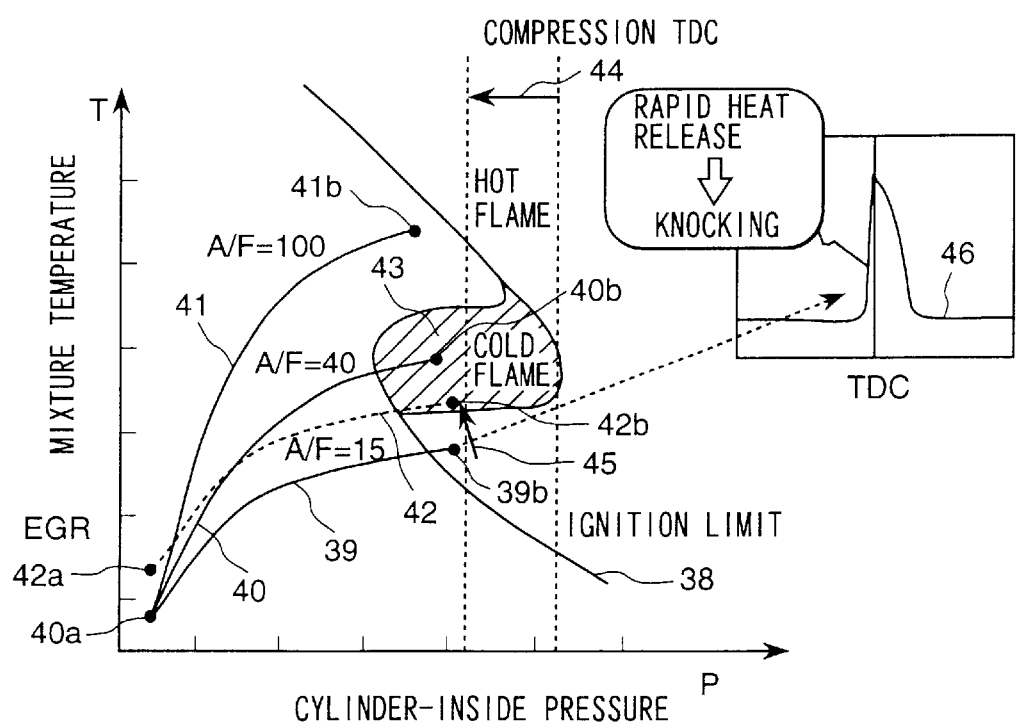
FIG. 4B is an illustration showing a cylinder-inside state and ignition limits which are representative for the compression ignition type engine.
Figure 8:
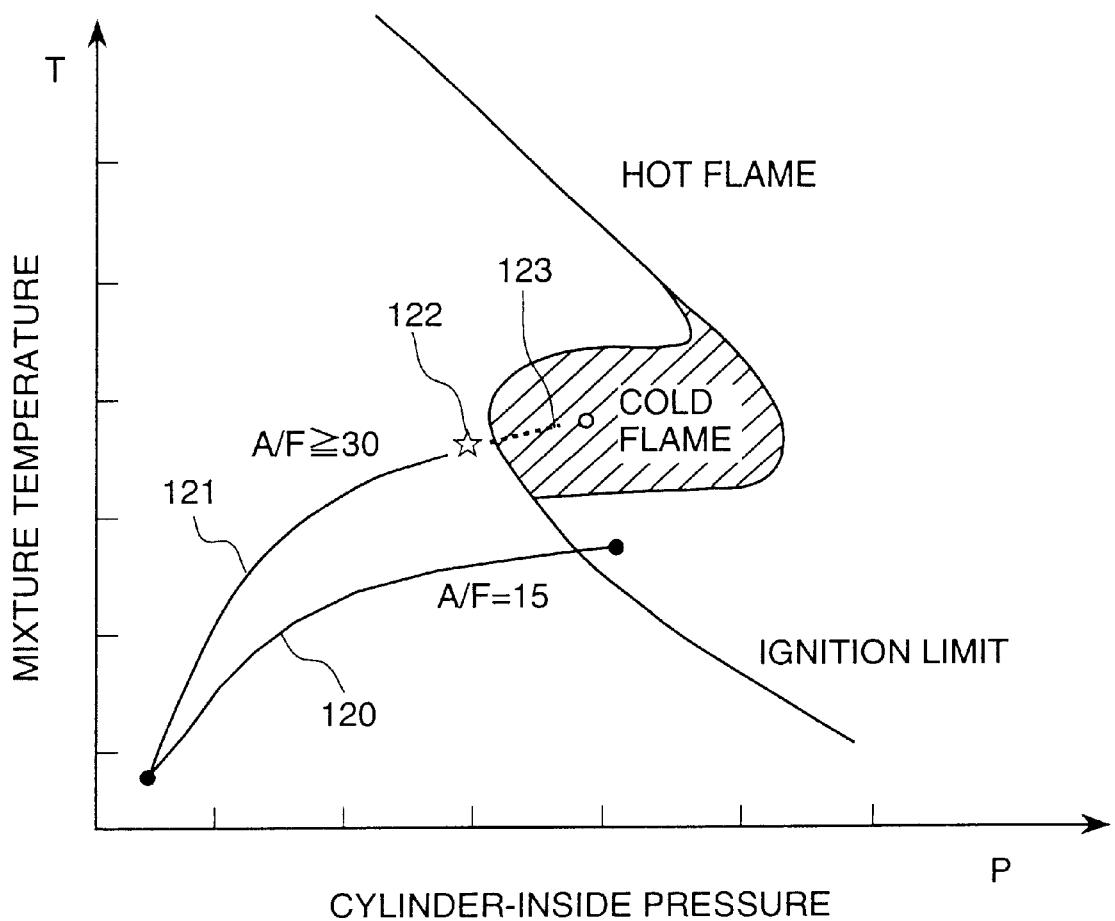
FIG. 8 is an illustration showing cylinder-inside temperature and pressure history at 2 times injection.

FIG. 4B shows an ignition limit of compression ignition combustion by using relations between temperatures and pressures. An ignition limit of mixture gas is shown by a curve 38. The curve 38 means that ignition does not occur on the left side of the curve 38 and occurs on the right side. Cold flames are generated in and around a region 43. The curve changes according to kinds of fuel and the concentration of a mixture, however, here, explanation will be taken assuming that the change width is small. A case where a mixture which is sufficiently mixed and has an air fuel ratio of 40 is taken into the combustion chamber and compressed is considered. At this time, the temperature and pressure before compression are shown by 40a. The pressure and temperature rise along a curve 40 by compression, and pass a cold flame region 43 and reaches a point 40b after compression. A cold flame as shown in FIG. 8 is generated when they passes through the cold flame region 43, and successively, a hot flame reaction occurs. That is, in the case of a mixture of an air fuel ratio of about 40, they pass through the cold flame region, so that normal compression ignition combustion is effected. Next, a case where an air fuel ratio is 15 will be considered. In the case of a mixture of a small air fuel ratio, a specific heat ratio becomes small, so that a temperature rise by compression becomes small. As a result, a rising course of pressure and temperature during compression is shown by a curve 39, and does not pass through the cold flame region 43. As a result, they reaches to a point 39b after compression, and a hot flame reaction is caused without a cold flame reaction. A heat generation rate at that time becomes sharp as shown by a curve 46, and such sharp heat release causes knocking. Difference in air fuel ratio of a mixture changes a point which pressure and temperature reach after compression, and the combustion condition differs according to whether the point is inside or outside the cold flame region. A point of the present invention is to control so that the point passes through the cold flame region even at time of high torque at which an air fuel ratio is small. Since it is considered as a cause of being not capable of passing through the cold flame region that the specific heat ratio becomes small when an air fuel ratio is small and temperature after compression becomes low, an initial temperature of a mixture is raised to a point 42a by applying EGR. The temperature reaches to a point 42b after compression, enters or passes through the cold flame region. As a method of applying EGR, an outer EGR system using a bypass passage led from an exhaust pipe to an intake pipe can be taken, however, an inner EGR system using a variable valve mechanism to change overlap of an exhaust valve is sufficient. Further, it also is considered that a long time is taken until it reaches a compression dead center after entering the cold flame region, depending on the concentration of a mixture and that an ignition time becomes much earlier than the upper dead center. Therefore, it is controlled so that the ignition time becomes closer to the upper dead center by reducing a compression ratio by delaying a closing timing of the intake valve, and by reducing the pressure after compression as shown by an arrow 44.

Figure 5:
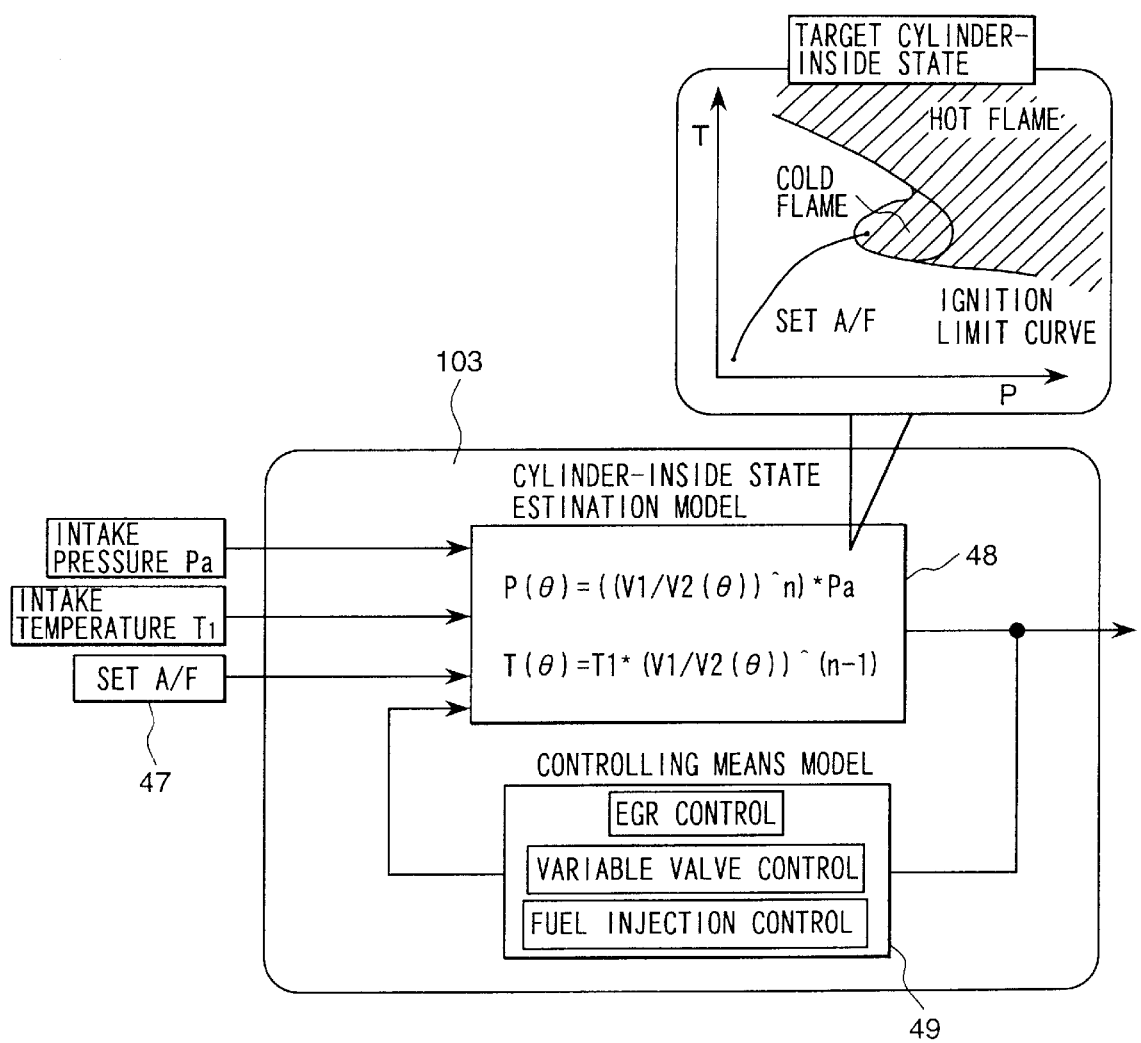
FIG. 5 is a schematic diagram of cylinder-inside estimating means, showing a control method of the present invention.

FIG. 5 shows a control content of the present invention. The control unit 5 of the engine detects an operation state and sets a target air fuel ratio. Since the ignition limit curve as shown in FIG. 4B is determined according to used fuel, it is possible to set a target cylinder-inside state (temperature and pressure). Whether or not the cylinder-inside state by an intake temperature T1, an intake pressure Pa and a set air fuel ratio 47 at present reaches the target cylinder-inside state, that is, whether or not it enters the cold flame region is estimated by using a cylinder-inside state estimation model 48. Calculation equations of the cylinder-inside state estimation model 48 is explained hereunder.

The equation (1) is used for estimation of a cylinder-inside pressure:

$$P(\theta)=Pa*\{V1/V2(\theta)\}^{\wedge}(n) \tag{1}$$

The equation (2) is used for estimation of a cylinder-inside temperature:

$$T(\theta)=T1*\{V1/V2(\theta)\}^{\wedge}(n-1) \tag{2}$$

Here, $P(\theta)$ is a cylinder-inside pressure at a crank angle $\theta$, Pa is a cylinder-inside pressure or intake-inside pressure immediately before start of compression, V1 is a volume of the combustion chamber immediately before start of compression, $V2(\theta)$ is a volume of the combustion chamber at a crank angle $\theta$, n is a politropic index, $T(\theta)$ is a cylinder-inside temperature at a crank angle $\theta$, and T1 is a cylinder-inside temperature or intake temperature immediately before start of compression. Calculation along the above equations (1) and (2) is unnecessary to conduct for each 1 degree of crank angle, but it is sufficient if the calculation is conducted only in a range of, for example, 40 degrees to 0 degree before the upper dead center within a change width of a target ignition time.

As shown in FIG. 4B, in the case where a set air fuel ratio is small and it does not enter the cold flame region, means such as introduction of EGR by using the variable valve and change in compression ratio is considered. Concretely, a difference between an estimation result of the cylinder-inside state after compression and a cold flame region which is a target cylinder-inside state is calculated, and a controlling means and an operation quantity optimum for correction of the difference is calculated, using a controlling means model.

Figure 6:
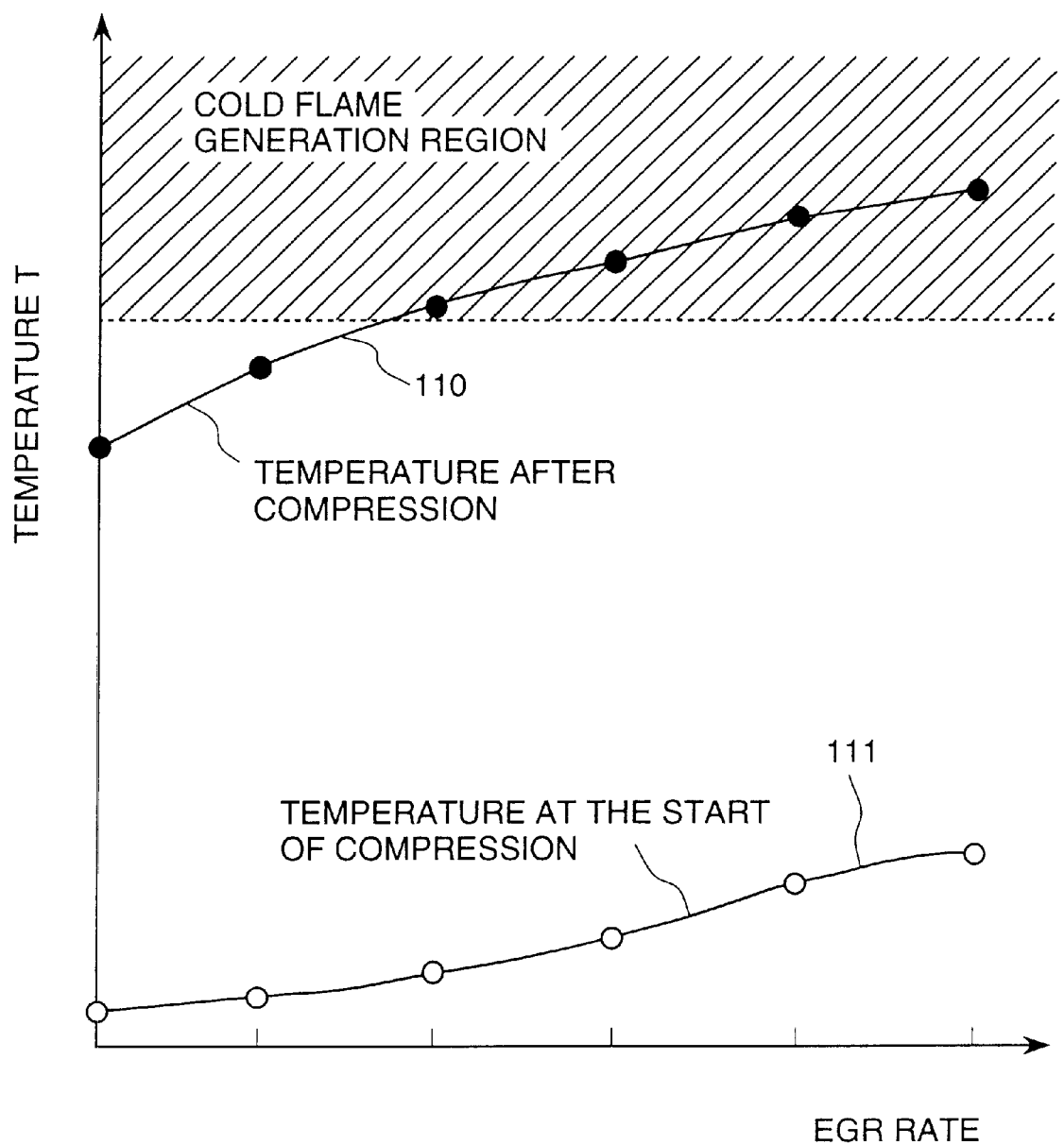
FIG. 6 is an illustration showing relations between EGR ratios and cylinder-inside temperatures after compression and at a time of compression start.

FIG. 6 shows a control method of a cylinder-inside state by EGR. It is possible to change a ratio of a new air quantity and an EGR gas quantity in the intake air, that is, an EGR rate, by changing an EGR gas quantity passing through the EGR valve 20. As the EGR rate increases, an exhaust gas quantity of relatively high temperature in the intake gas increases, so that an intake gas temperature rises and the cylinder-inside temperature at start of compression rises as indicated by a curve 111. As a result, the cylinder-inside temperature after compression changes as indicated by a curve 110, and it is possible to raise the temperature higher than a temperature at which a cold flame is generated.

Figure 7A:
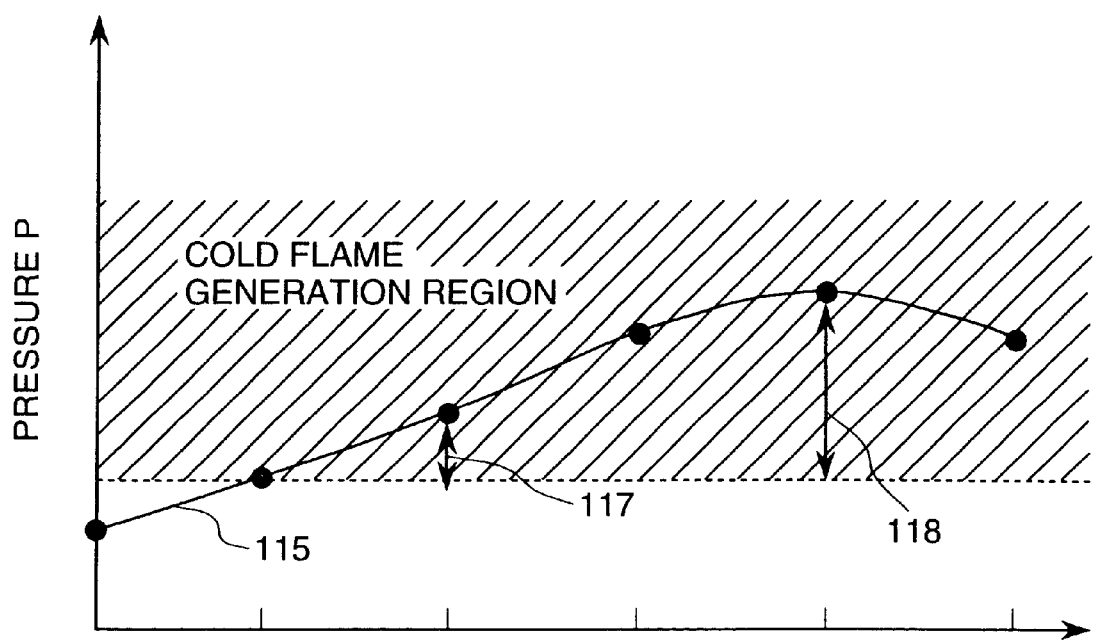
FIG. 7A is an illustration showing a relation between valve opening timing of an intake valve and cylinder-inside pressures.
Figure 7B:
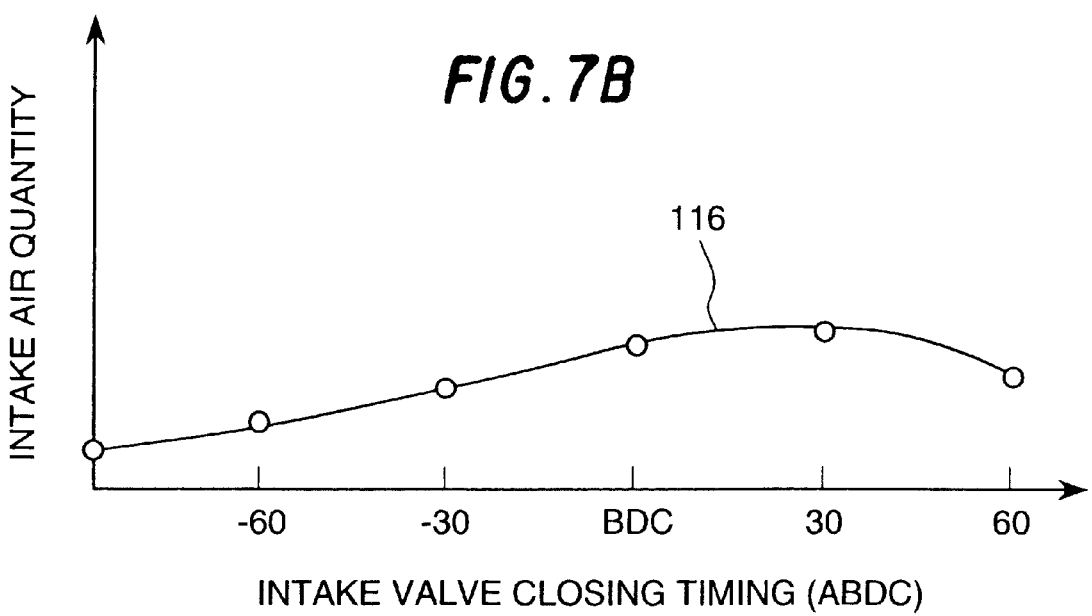
FIG. 7B is an illustration showing a relation between valve opening timing of an intake valve and intake air quantities.

FIGS. 7A and 7B show a control method of a cylinder-inside state by a variable valve.

An intake air quantity changes as indicated by a curve 116 by changing valve-closing timing of an intake valve. As a result, the cylinder-inside pressure after compression changes as indicated by a curve 115, it is possible to make the pressure higher than the pressure at which a cold flame is generated. A cold flame generation region is almost determined by used fuel, so that the minimum temperature and the minimum pressure for generating cold flame as shown in FIGS. 6 and 7 do not change largely. Although one point of the present invention is to control so that the cylinder-inside state passes through the cold flame region, it is important for engine combustion to ignite in the vicinity of the compression upper dead center to burn. In FIGS. 7A and 7B in the case where closing timing of the intake valve is set 30° ABDC, the pressure after compression becomes higher than the minimum pressure in the cold flame generation region, as shown by a line 118. Under this condition it enters the cold flame generation region midway through compression, and ignition is caused much earlier than the upper dead center to effect combustion. In order to ignite in the vicinity of the upper dead center, it is necessary to make small the difference between the pressure after compression and the minimum pressure in the cold flame generation region. Therefore, the closing timing of the intake valve is changed and control is effected so as to lower a substantial compression ratio.

FIG. 8 shows a method of passing through the cold flame region by fuel injection.

Figure 9:
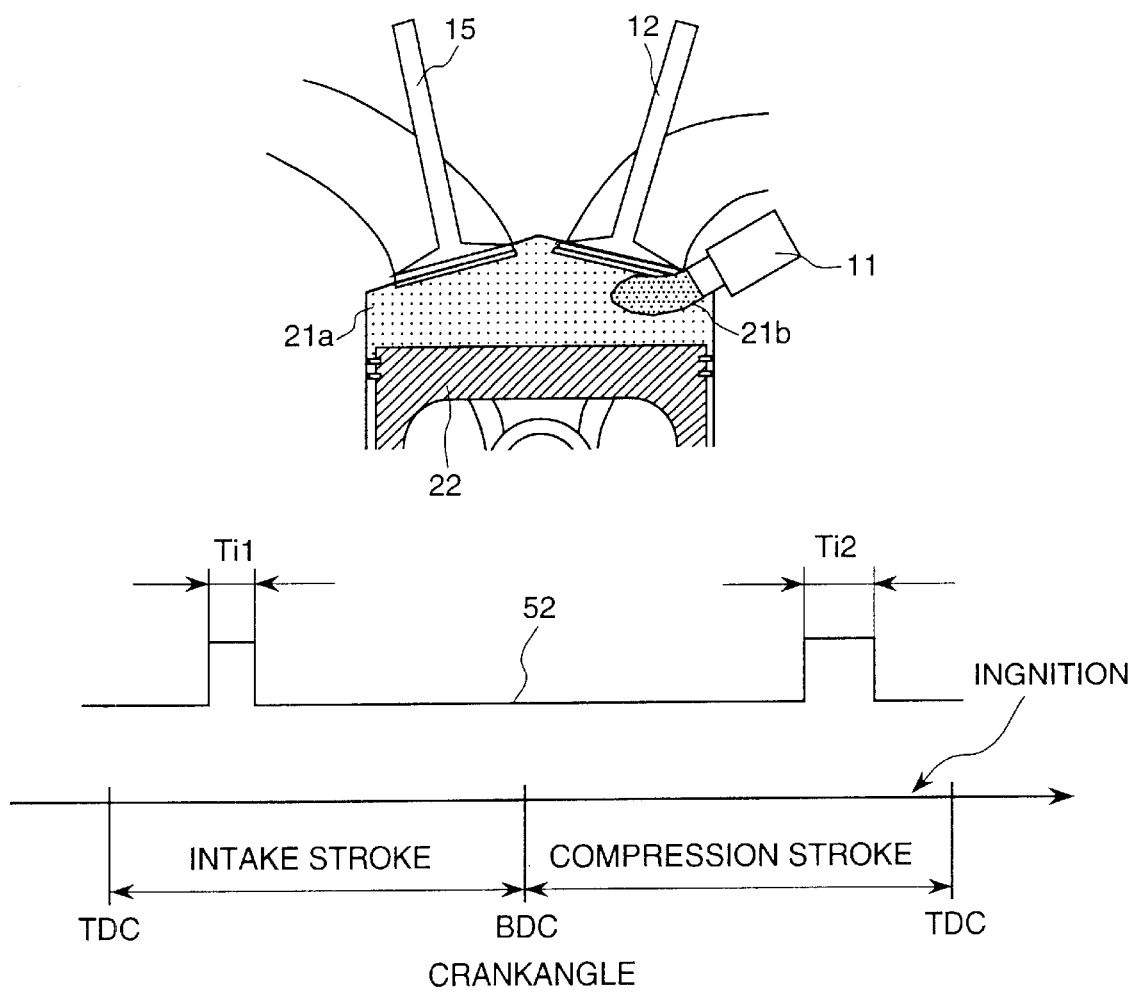
FIG. 9 is an illustration showing an inside of a combustion chamber and mixture condition at 2 times injection.

A subject is too early ignition on the side of high torque of a compression ignition engine, that is, when an air fuel ratio is small, and when a fuel quantity equivalent to an air fuel ratio of about 15, for example, is injected during intake stroke in a time, history of temperature and pressure of a mixture inside the cylinder is as shown by a curve 120 and do not pass through the cold flame region. On the contrary, when a fuel injection amount during intake stroke is made a half or less of all the fuel injection amount and an air fuel ratio is made about 30 or more, the history of temperature and pressure of the cylinder-inside mixture becomes as shown by a curve 121. This is because the politropic index n of the equations (1) and (2) becomes large by making the air fuel ratio large, and the temperature rises. Therefore, in the case of a mixture of air fuel ratio of about 30 to 40 or so, it enters the cold flame region as shown by a dotted line 123 by compressing the mixture as it is, and the mixture is ignited and burnt. However, in this case, it is difficult to output necessary torque because of a smaller injected fuel quantity, so that the remaining fuel quantity is injected late in compression stroke. The timing of fuel injection is in the vicinity of a star * by indicated by 122 and before entering the cold flame region. The state inside the combustion chamber at this time is shown diagrammatically in FIG. 9. Reference number 52 denotes an injection pulse signal. A mixture 21a is formed by fuel injected with pulse width Ti1 during intake stroke. An air fuel ratio of this mixture is about 30 or more. Fuel 21b is injected with pulse width Ti2 late in compression stroke. Since it is desirable to ignite after the fuel 21b is diffused moderately in the combustion chamber, injection timing of the fuel 21b is determined by considering diffusion time of fuel spray, etc.

Figure 10:
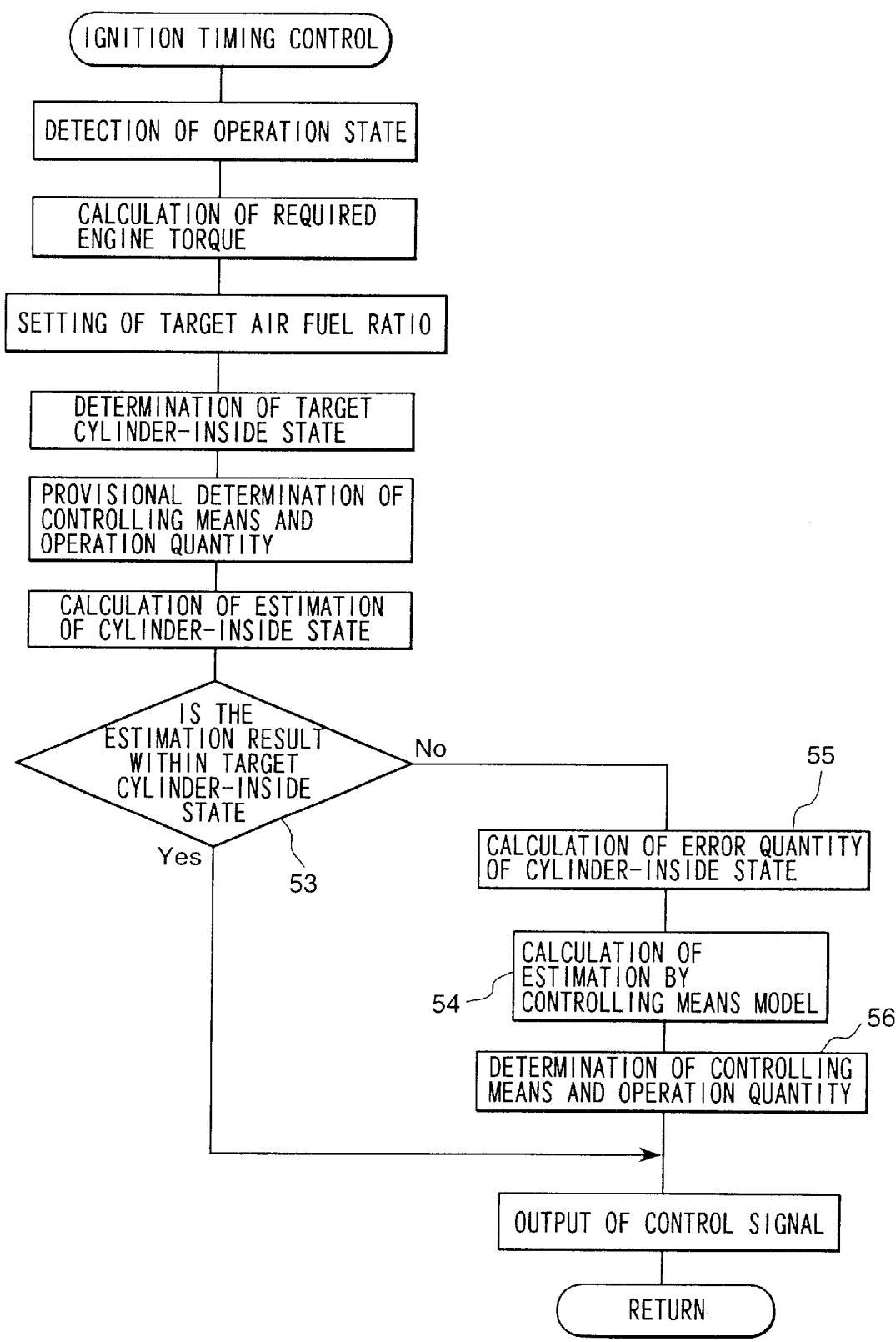
FIG. 10 is a flow chart of ignition timing control according to the present invention.

FIG. 10 shows a control flow chart of the present invention.

When the engine is operated in compression ignition mode, ignition timing control is always conducted. First, the operation state detecting means calculates required engine torque from an accelerator opening, a vehicle speed, a change gear position, etc. Further, an engine speed (revolution numbers) is read, and a target air fuel ratio is set. A target cylinder-inside state depending on used fuel is determined. The target cylinder-inside state means a region of temperature and pressure generating a cold flame. A controlling means suitable for the current operation condition and its operation quantities (a quantity of EGR and opening timing of the intake valve) are provisionally determined, an intake pressure Pa and intake temperature T1 are read and a cylinder-inside state after compression at the target air fuel ratio is estimated. In step 53, the estimation result and the target cylinder-inside state are compared, and when the estimation result is within the target cylinder-inside state, that is, the cold flame region, a control signal is output to the cylinder-inside state controlling means. When the estimation result is separate from the target cylinder-inside state, the difference quantity is calculated in step 55, a variable valve operation quantity and an EGR quantity for correcting the difference are estimated by a controlling means model, using data stored in advance in ROM of the control unit in step 54.

Figure 11:
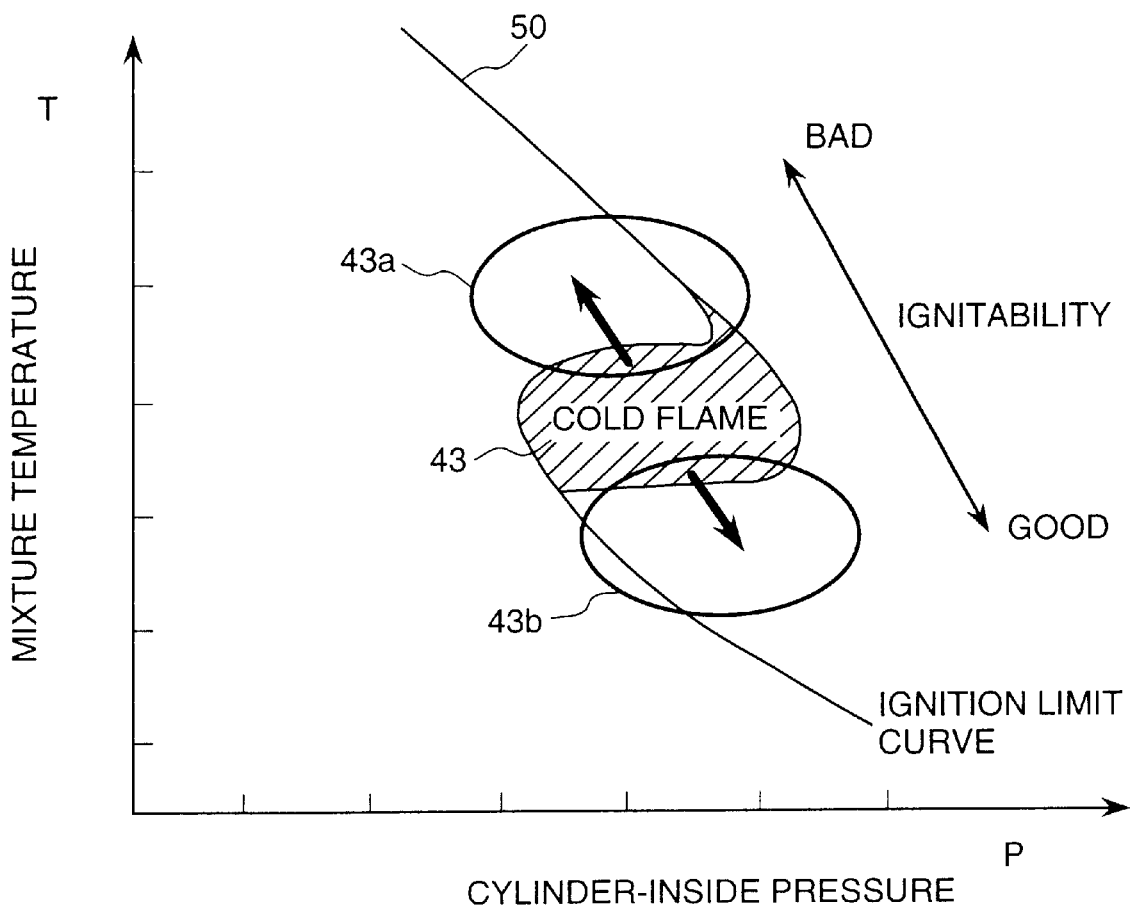
FIG. 11 is an illustration showing a relation between fuel ignitability and cold flame generation regions.

FIG. 11 shows a relation between the ignitability of fuel and cold flame regions.

In FIG. 11, 50 denotes an ignition limit curve of used fuel, and 43 denotes cold .flame regions. The cold flame regions differ from each other according to fuel compositions, they move toward a low temperature side as a cold flame region 43b in a case of good ignitability and move toward a high temperature side as a cold flame region 43a in a case of bad ignitability. The ignitability can be-adjusted, for example, by mixing gasoline/light oil.

Figure 12:
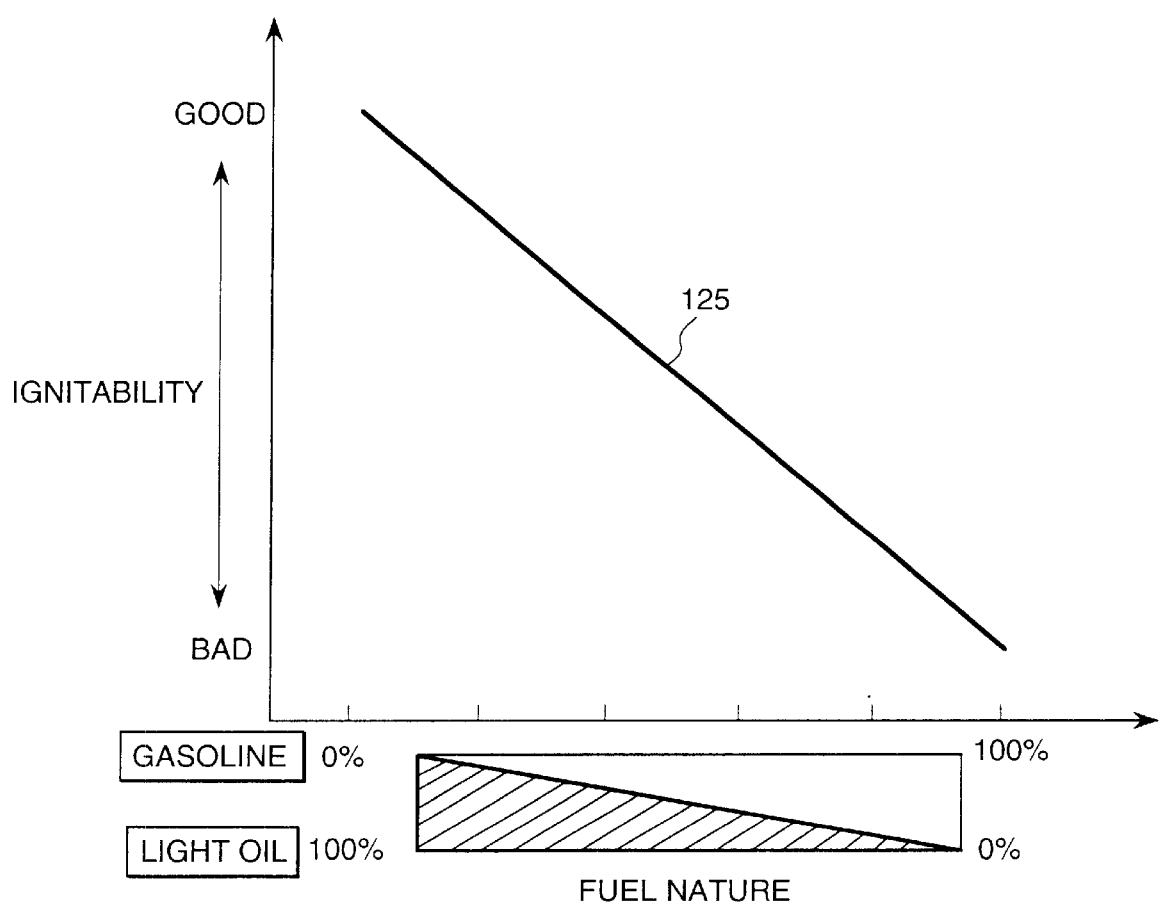
FIG. 12 is an illustration showing a relation between fuel mixing ratios and ignitability.

FIG. 12 shows a relation between a mixing rate of gasoline/light oil and ignitability. Light oil used as fuel for diesel engines is good in ignitability and auto-ignites in a high temperature atmosphere. On the other hand, gasoline is bad in ignitability and ignited with igniting energy supplied by a spark plug in gasoline engines. Therefore, the ignitability can be controlled as a line 125 by changing their mixing rate.

Figure 13:
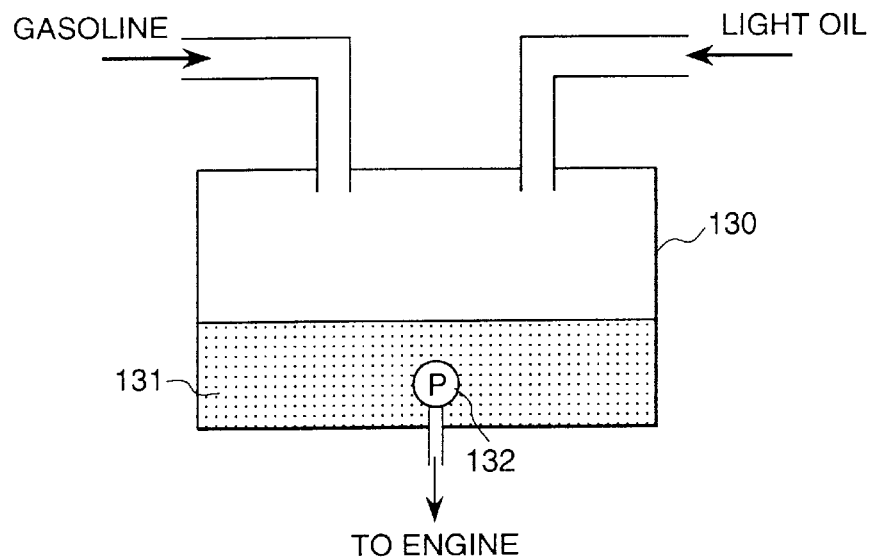
FIG. 13 is a schematic diagram of a construction of a fuel tank.
Figure 14:
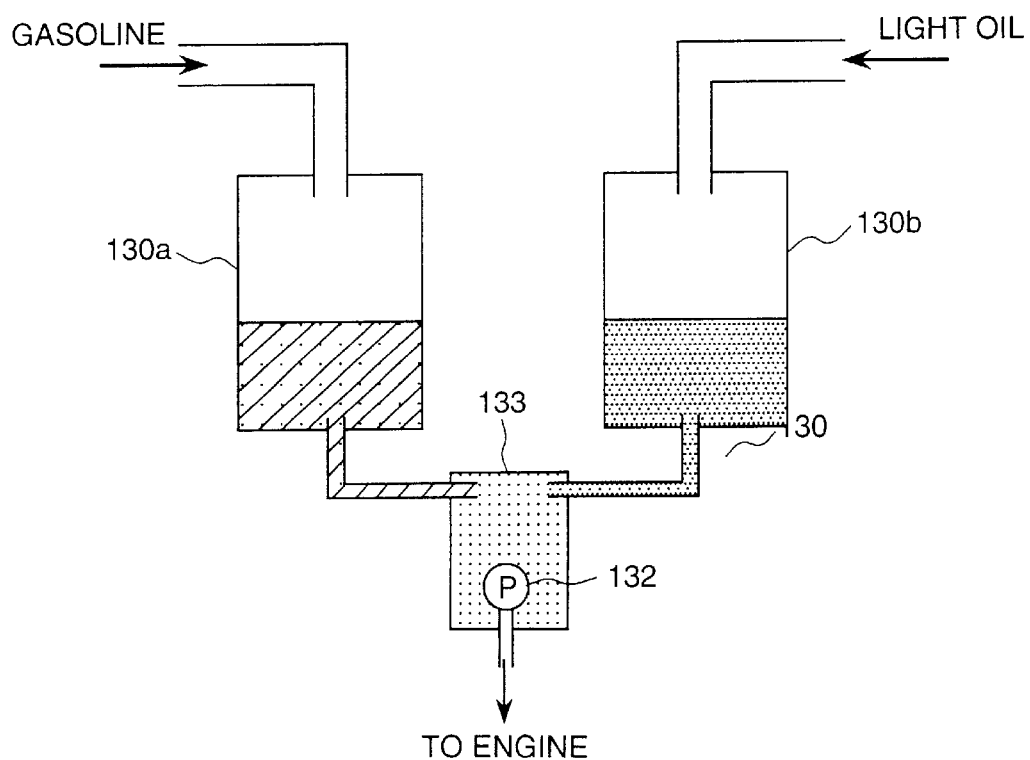
FIG. 14 is a schematic diagram of a construction of a fuel tank with a fuel mixing apparatus.

As a method of controlling a mixing rate, there are considered two methods, one of which is a method in which gasoline and light oil are supplied into a fuel tank 130 at a prescribed ratio to produce mixed fuel 131 and the mixed fuel is transferred to an engine by a fuel pump 132 in the fuel tank, as shown in FIG. 13, and the other is a method in which a gasoline fuel tank 130a and a light oil fuel tank 130b are prepared separately, gasoline and light oil therefrom are mixed in a mixing apparatus 133 at a prescribed ratio and the mixed fuel is transferred to an engine by the fuel pump 132, as shown in FIG. 14.

Another embodiment of the present invention will be described hereunder, referring to FIG. 15.

The basic construction of the present embodiment is the same as the embodiment shown in FIG. 1, so that explanation thereof is omitted. Difference from the embodiment shown in FIG. 1 is that the present embodiment has an ignition plug 57 installed.

Figure 16:
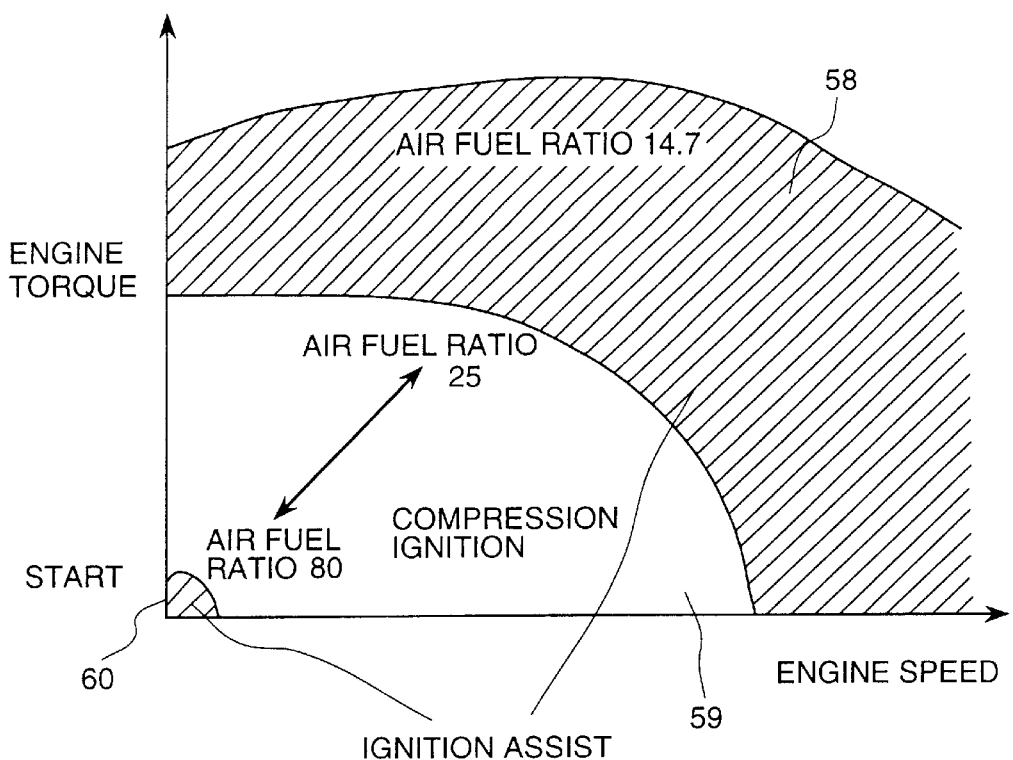
FIG. 16 is an illustration showing an operation region in the second embodiment.

FIG. 16 shows an operation region in the present embodiment. In FIG. 16, an abscissa is engine speed and an ordinate is engine torque. The ignition plug is used in regions 58, 60, each expressed with oblique-lines. The region 60 expresses a time of start.

Figure 17:
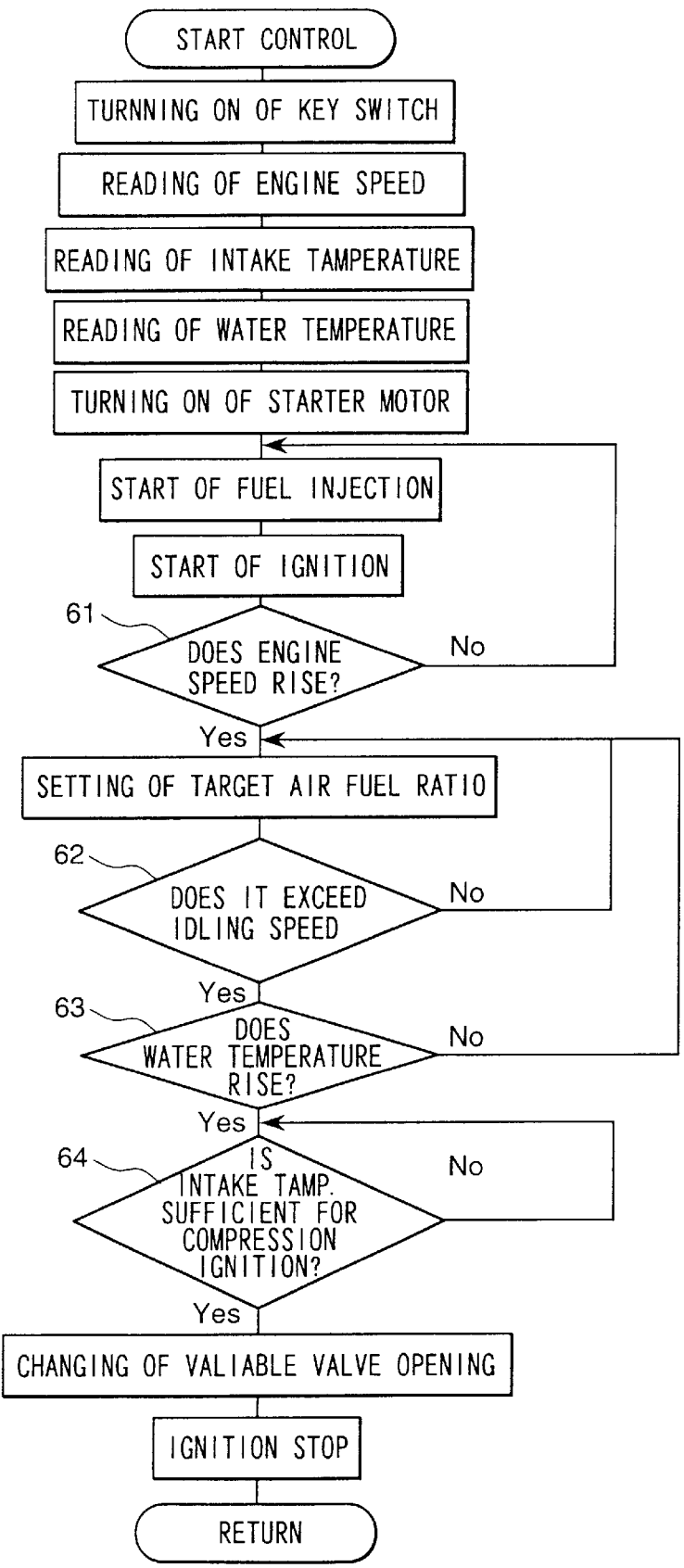
FIG. 17 is a flow chart of starting control in the second embodiment.

FIG. 17 shows a control flow chart.

Upon turning on of a key switch, first-of all, reading of engine speed, intake temperature and water temperature starts. The engine speed is still 0 rpm at this time. After that, a starter motor is turned on to start cranking. Cranking engine speed is 200 to 300 rpm. Further, fuel injection and ignition are started, and it is confirmed that engine speed rises, in step 61. A fuel supply amount at a time of cranking is set a little smaller in air fuel ratio than a theoretical air fuel ratio so that the start can be smoothly done. After the engine speed has risen, a target air fuel ratio is set close to the theoretical air fuel ratio so that normal combustion can be conducted. In step 62, it is confirmed whether the engine speed exceeds an idling revolution numbers. In step 63, it is confirmed whether the water temperature has risen sufficiently. When the water temperature is low, the target air fuel ratio is set a small value, and a heat generation amount is increased. Finally, in step 64, it is confirmed whether or not an intake temperature is one capable of compression ignition, then, the target air fuel ratio is set in a range in which compression ignition is possible, and an air flow rate is increased by changing an opening of the variable valve. At the same time, ignition is stopped.

Figure 18:
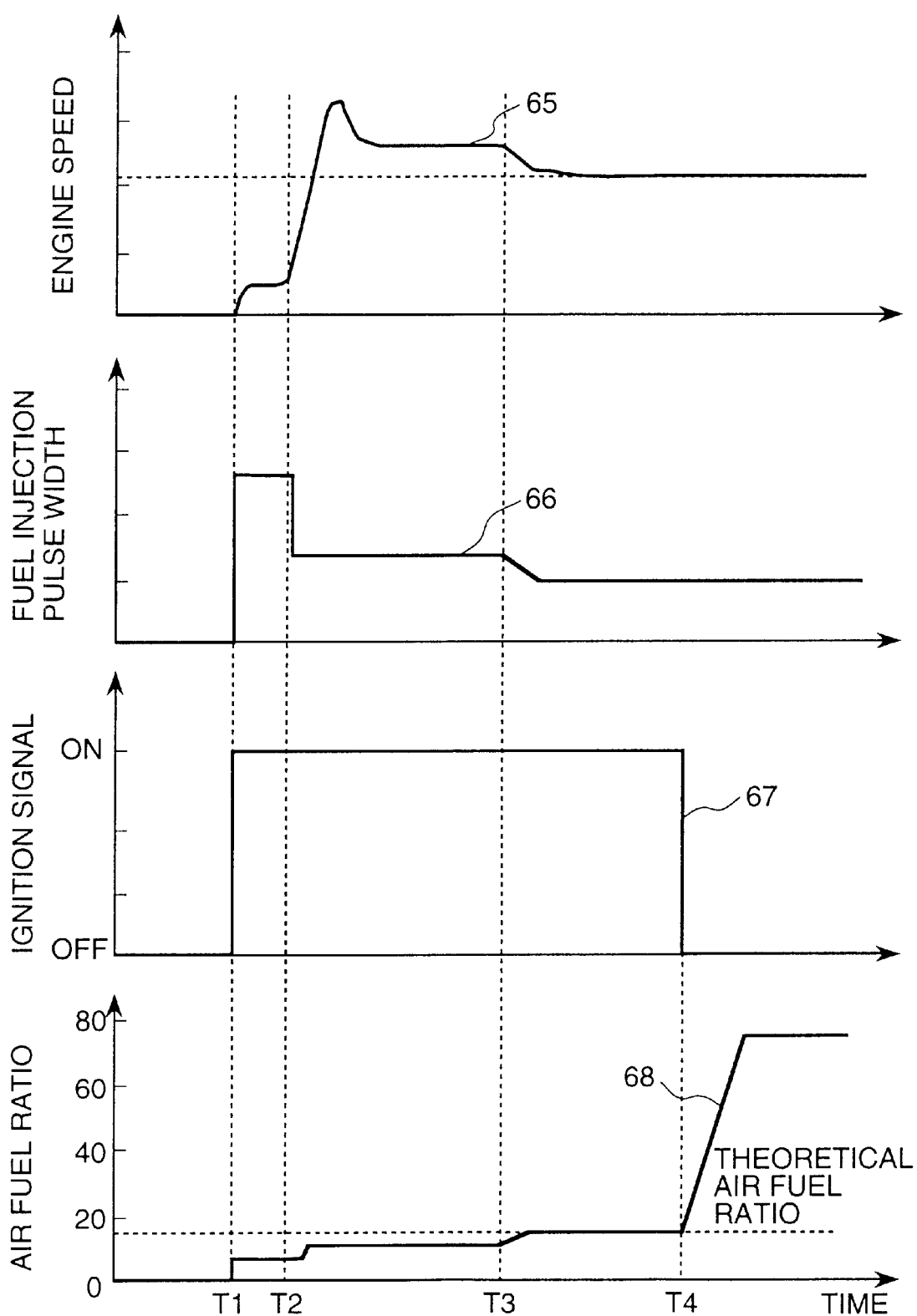
FIG. 18 is time charts in the case where the starting control is applied.

FIG. 18 shows time charts of engine speed, fuel injection pulse width, ignition signal and air fuel-ratio in a time of start.

At time 0, the key switch is turned on and at the time T1 the starter motor is started. The engine is rotated by the starter to run at 200–300 rpm. At this time, fuel injection and ignition are started. At the time of cranking, a relatively large quantity of fuel is injected. Therefore, the air fuel ratio becomes smaller than the theoretical air fuel ratio. When the engine speed rises at time T2, fuel injection pulse width is shortened to make the air fuel ratio a little larger, whereby normal combustion is effected. The water temperature increases by heat from the engine until it reaches time T3. After the water temperature has risen, the fuel injection pulse width is further shortened to set the air fuel ratio to the theoretical ratio. Then, it is confirmed whether or not the intake temperature is a temperature capable of compression ignition, when compression ignition is possible, ignition is stopped at time T4. At the same time, an opening of the variable valve has been changed, so that an air flow rate increases and an air fuel ratio becomes large. When it enters a compression ignition region 59 shown in FIG. 16, the ignition timing control shown in FIG. 10 is successively conducted. The air fuel ratio changes to 80–25 according to required torque in the compression ignition region 59, however, an emission amount of NOx from the engine is several 10 ppm which is a small value. When the required engine torque is further large, it is shifted to the region 58. In the region 58, spark ignition type combustion in which ignition is effected by a spark plug is taken, and a set air fuel ratio is the theoretical air fuel ratio so that three-way catalyzer can be used. Therefore, an emission amount of NOx from a vehicle exhaust pipe is small in this region also.

Figure 19:
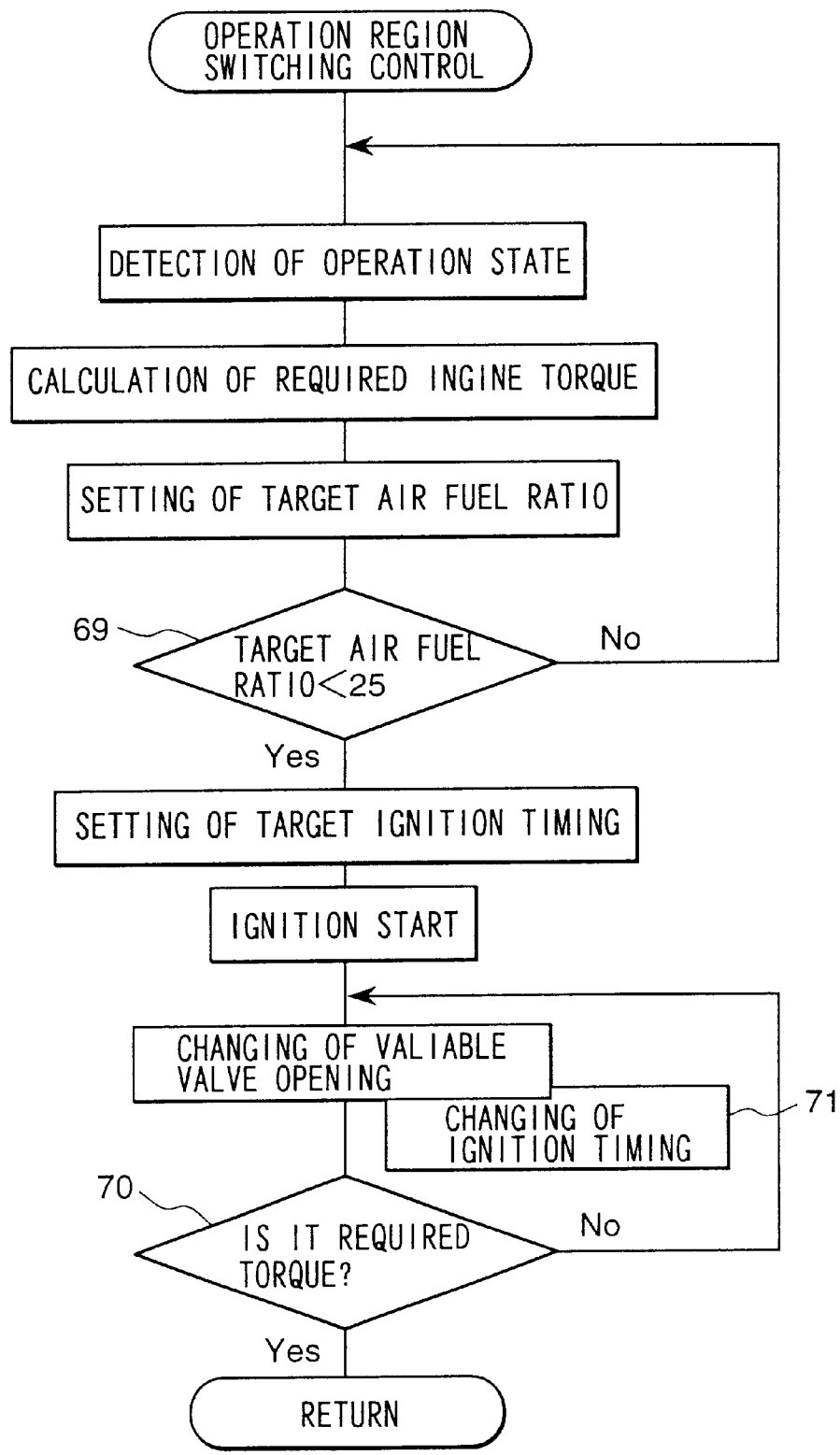
FIG. 19 is a flow chart of switching control of operation regions in the second embodiment.

FIG. 19 shows a control flow chart when the compression ignition region 59 and the ignition assist region 58 are changed from each other. Within the compression ignition region 59, required engine torque is calculated from an accelerator opening, a vehicle speed and a speed change gear position. Further, a target air fuel ratio is set from a map of engine speed. When the target air fuel ratio has become 25 or less, it is shifted to the ignition assist region 59. The air fuel ratio 25 is a limit air fuel ratio at which low NOx combustion can be effected by compression ignition. When it is shifted to the ignition assist region, first of all, target ignition timing depending on an operation condition is set, and ignition is started. At this time, the air fuel ratio is still 25 or so which is larger than an ignition limit air fuel ratio of a homogenous mixture, so that combustion by compression ignition is effected without ignition by the spark plug. Next, an air flow rate is reduced by throttling the variable valve so-that the air fuel-ratio becomes the theoretical air fuel ratio, and ignition combustion starts. At the same time, in step 71, the ignition timing also is adjusted. After being shifted to the ignition assist region, it is confirmed at step 70 whether or not the engine torque is the required engine torque, and when the real engine torque is different from the required engine torque, an air flow rate is adjusted so that the air fuel ratio does not change, to change the torque.

Figure 20:
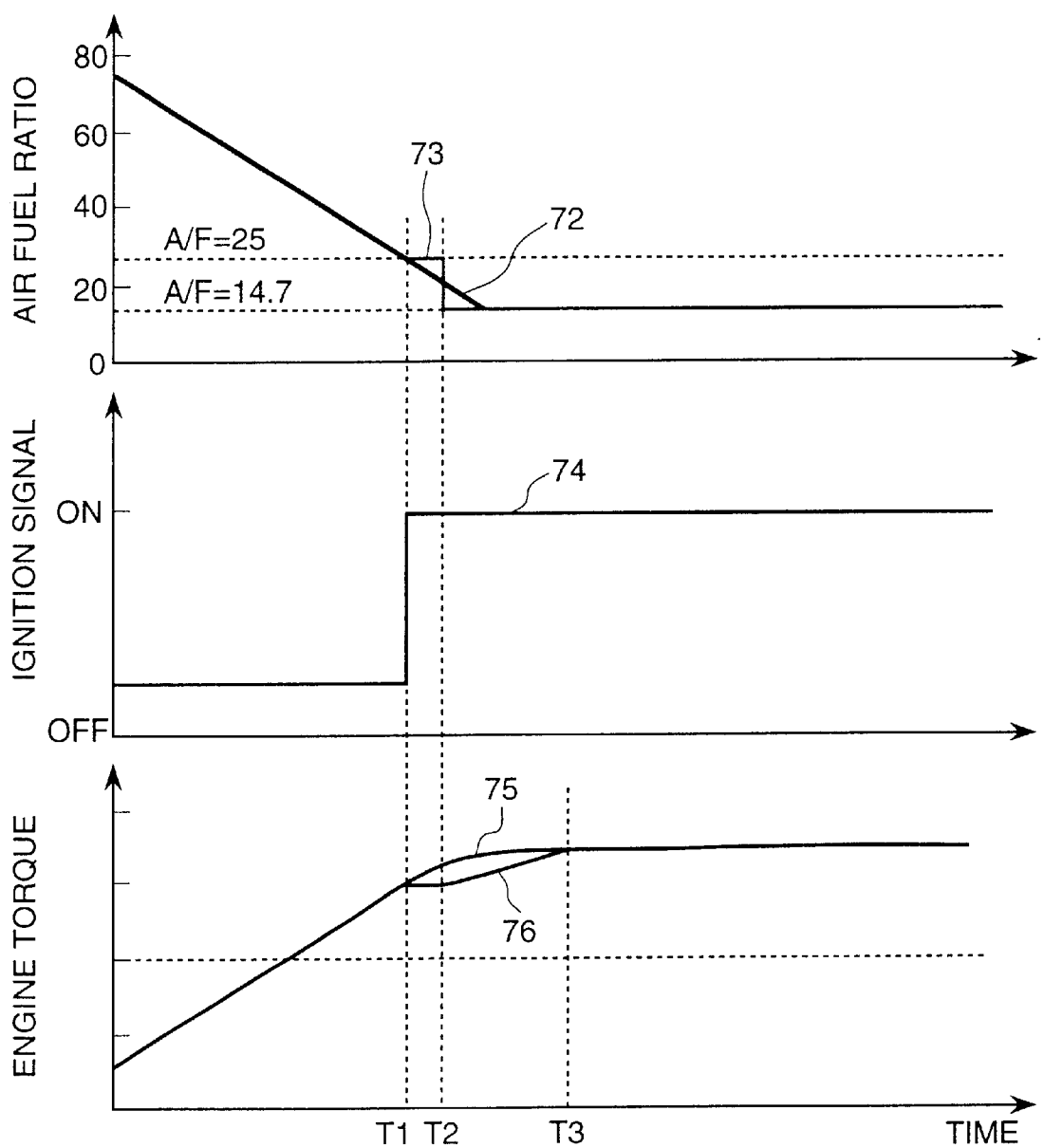
FIG. 20 is time charts in the case where the switching control of operation regions is applied.

FIG. 20 shows a time chart when operation regions are switched.

In the compression ignition region, an air fuel ratio changes until it reaches about 80–25, depending on engine torque. An ignition signal has been turned off, of course. 72 denotes a target air fuel ratio, and 73 denotes a real air fuel ratio. Further, 75 denotes target engine torque and 76 real engine torque. When the target air fuel ratio becomes 25 or less at time T1, a fuel injection quantity is controlled so that an air fuel ratio becomes about 25, at the same time, ignition is started. An operation quantity of the variable vale is changed at time T2 to control the air fuel ratio so as to become the theoretical air fuel ratio. At this time, a fuel injection quantity is not changed, so that engine torque is smoothly switched. After that, an operation quantity of the variable valve is changed so that the theoretical air fuel ratio does not change, to cause the engine torque to approach.a target value. The switching control is completed within 100 msec, so that the comfortableness on a running vehicle is not detracted thereby.

Figure 21:
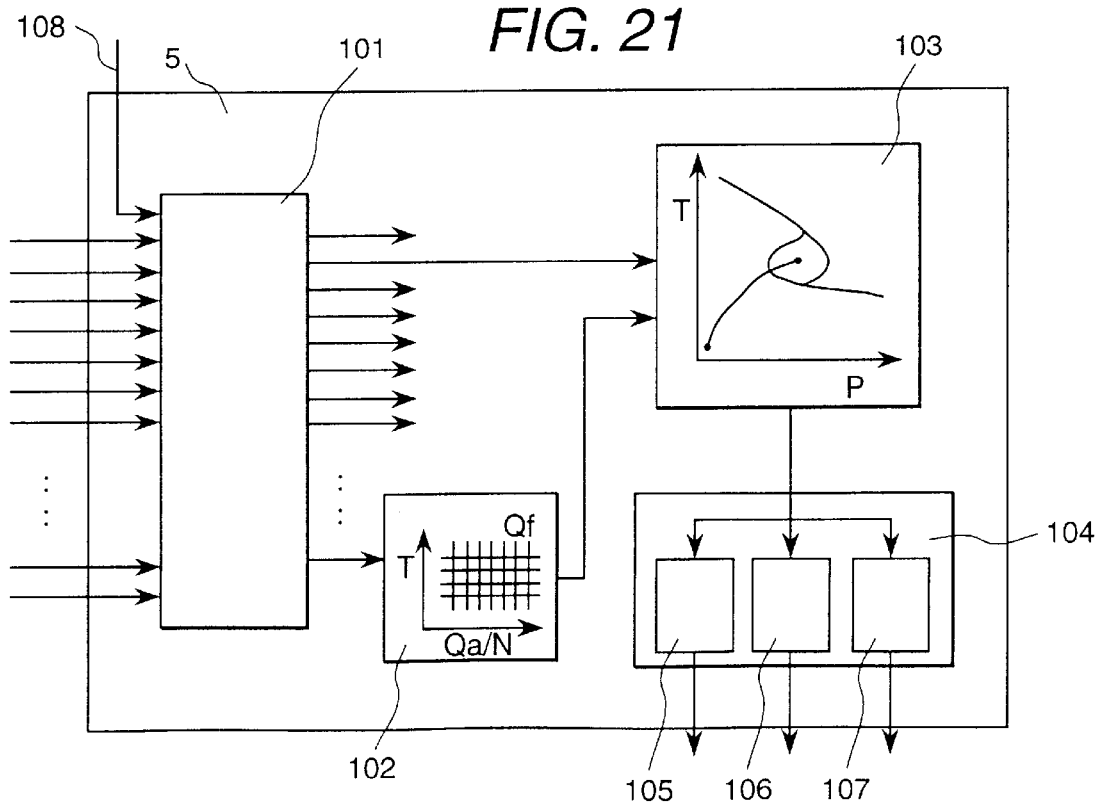
FIG. 21 is, a schematic diagram of a construction of a control unit in a third embodiment of the present invention.

Another embodiment is described hereunder, referring to FIG. 21.

Figure 15:
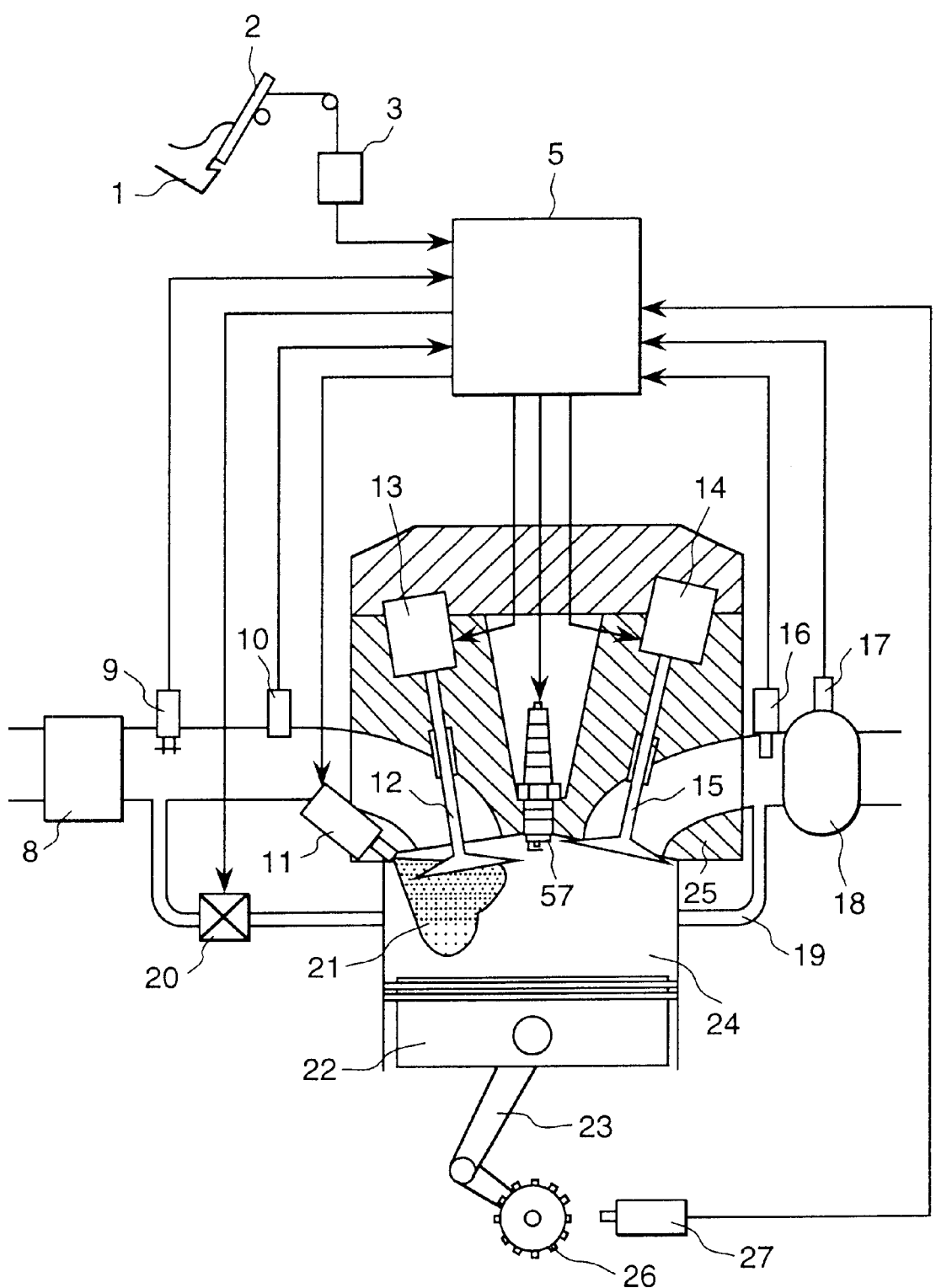
FIG. 15 is a schematic diagram of an engine system of a second embodiment of the present invention.

An engine construction of the present embodiment is the same as shown in FIG. 15, and there is considered a case where a sensor such that a combustion reaction inside the engine combustion chamber can be detected is installed. FIG. 21 shows a schematic construction of control unit 5 in this case. In this construction, a feedback signal 108 is added to the construction shown in FIG. 2. In this feedback signal, a result of detection of combustion reaction, etc, can be used.

Figure 22:
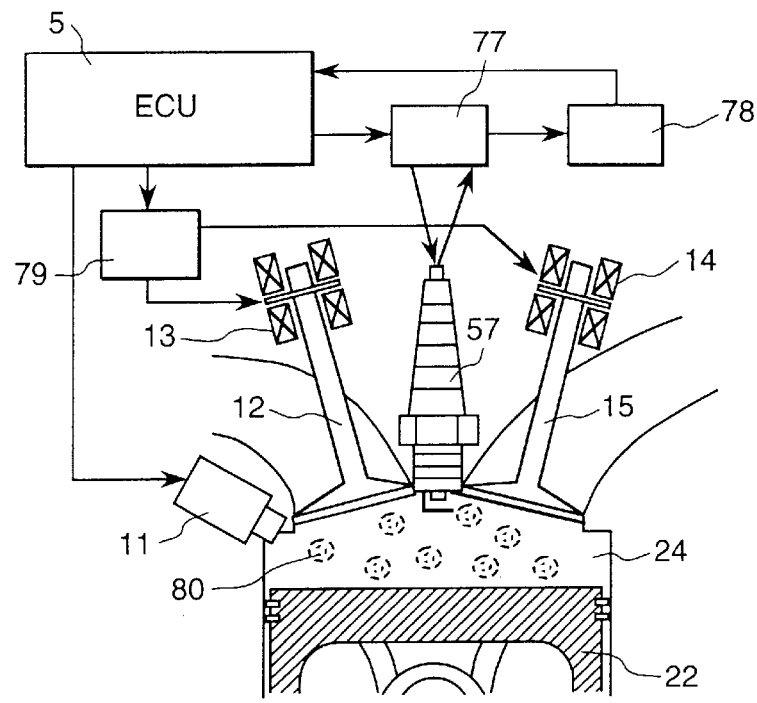
FIG. 22 is a schematic diagram of an engine system in the third embodiment.

FIG. 22 shows a construction in which the spark plug 57 is used as a combustion reaction sensor for which an ion current sensor detecting ion current generated inside the combustion chamber is used. In the operation regions shown in FIG. 16, the spark plug is used as a device for supplying ignition energy in the regions 58 and 60, however, the spark plug is not used in the compression ignition region 59. Here, in this region, the spark plug is used for a device for detecting ignition timing at a time of compression ignition. In the ignition assist region, an ignition coil 77 supplies ignition energy to the spark plug 57 by amplifying an ignition signal from the control unit 5 to rise voltage. In the compression ignition region, the spark plug 57 is supplied with high voltage from the ignition coil and used as the ion current detection device. When combustion is caused in the combustion chamber, radicals due to intermediate productions are generated, and current flows between spark plugs to which high voltage has been applied. This is ion current. The ion current is transferred to a detector 78 to be processed.

Figure 23:
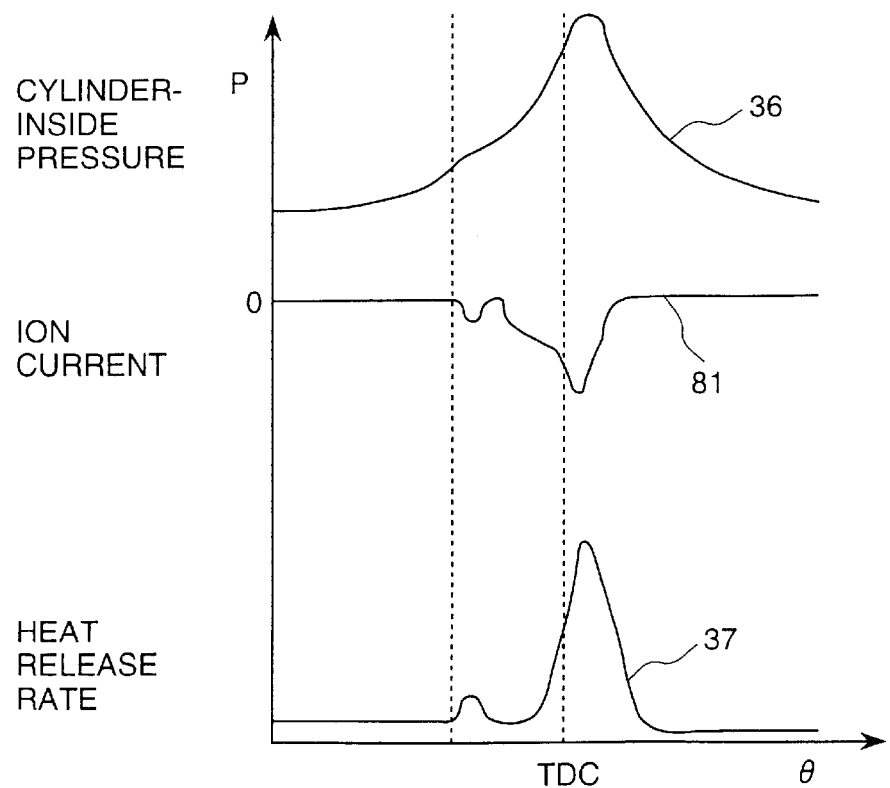
FIG. 23 is an illustration showing representative cylinder-inside pressure wave shape, heat release rate wave shape and ion current wave shape of a compression ignition type engine.

FIG. 23 shows a detection result of ion current. 36 denote a cylinder-inside pressure wave-shape and 37 denotes heat release rates. 81 denotes an ion current wave-shape which is a wave shape generally corresponding reversely to the heat release rates 37. It is possible thereby to detect generation time of a hot flame, that is ignition time. Further, in the case where misfire takes place, the ion current does not flow, so that it can be applied for misfire detection.

Figure 24:
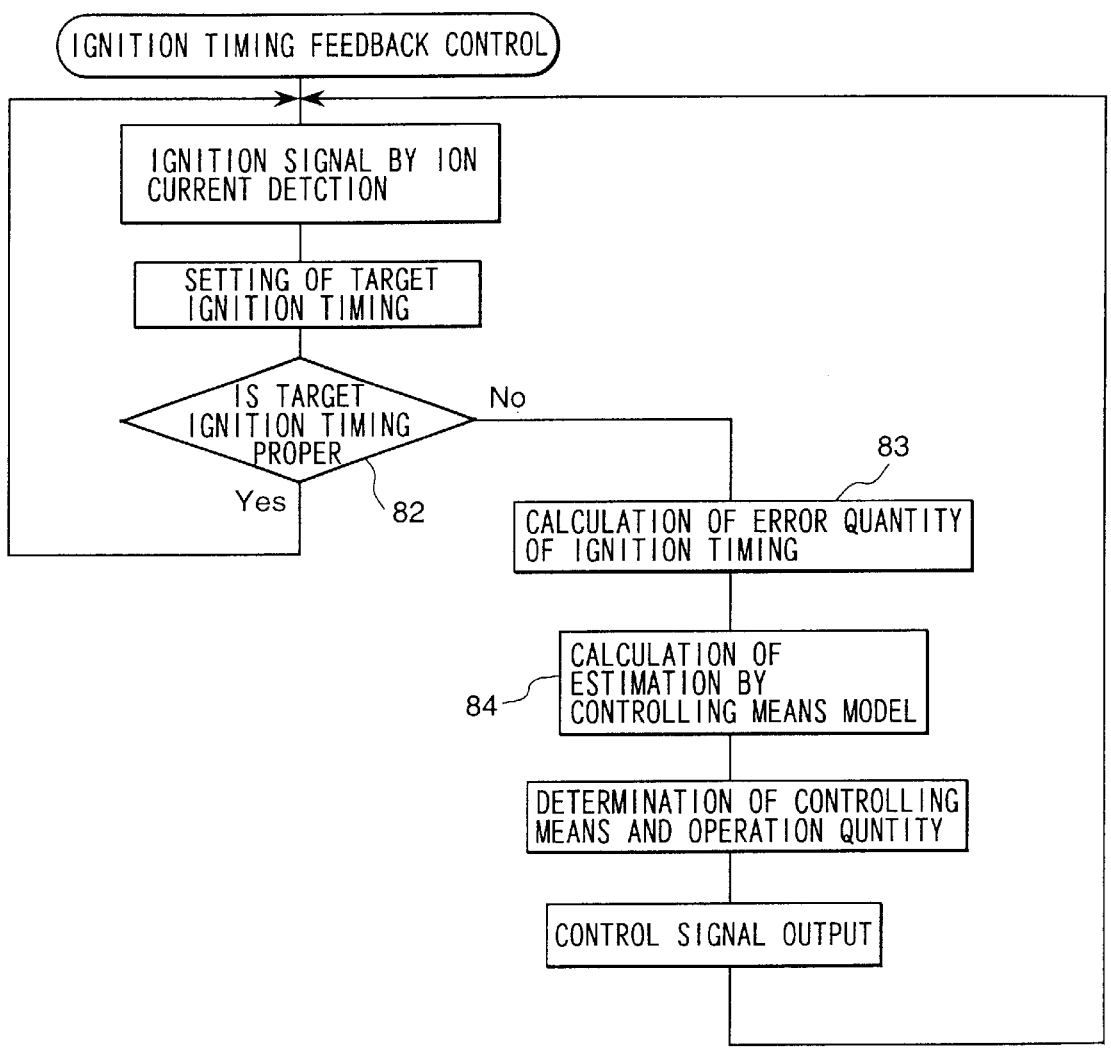
FIG. 24 is a flow chart of ignition timing feedback control in the third embodiment.

FIG. 24 shows a flow chart of ignition time feedback control.

In step 82, ignition time by ion current detection and target ignition time according to operation condition are compared, if there is any difference therebetween, a quantity of the difference is calculated in step 83, an operation quantity of the variable valve and an EGR quantity are determined so as to be a proper value, and its signal is output to practice. The feedback control is repeated.

Figure 25:
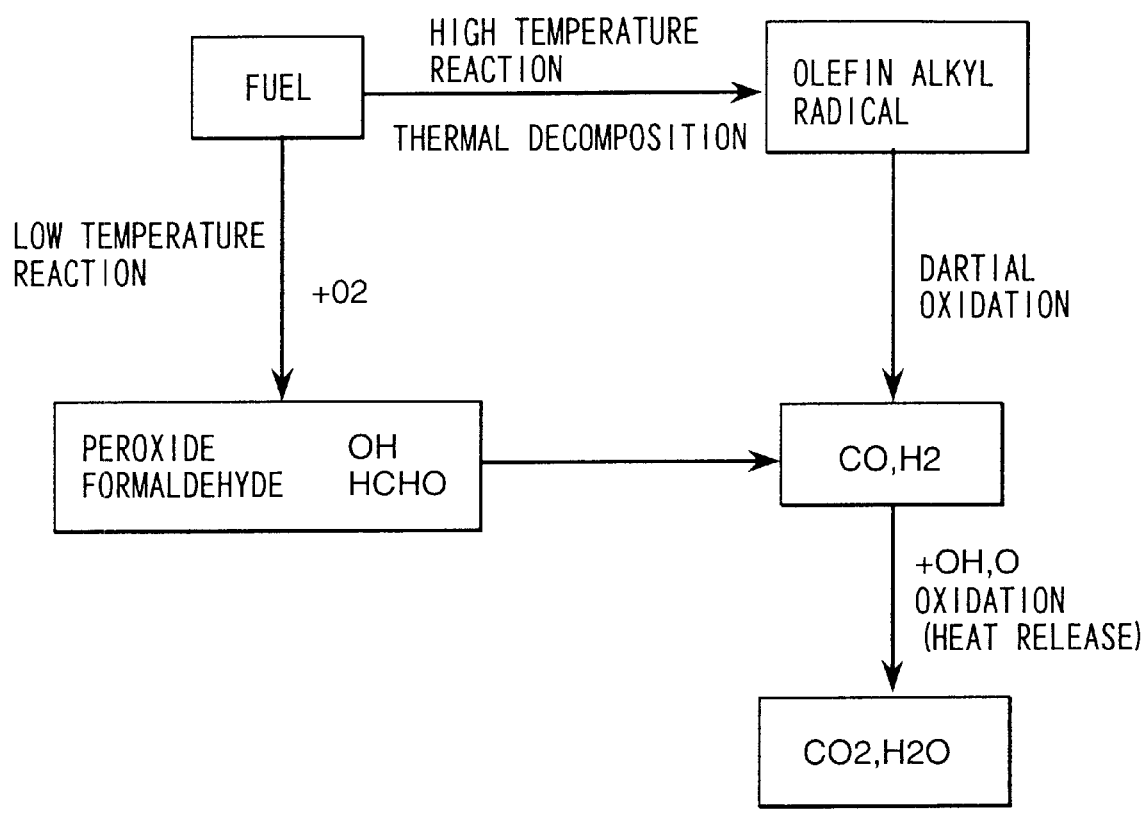
FIG. 25 is a block diagram for explanation of reaction courses of ignition combustion.

Reaction courses of ignition combustion are explained, referring to FIG. 25.

In the present embodiment, (A) ignition combustion by spark plug and (B) ignition combustion by compression are explained. In (A), a mixture (gasified fuel and air) around the spark plug is supplied with ignition energy from the spark plug and thermally decomposed to produce olefin, alkyl radicals. Olefin, alkyl radicals are oxidized while reacting with $O_2$ in surroundings to produce CO, $H_2$, and then combustion takes place in a state of hot flame as a rapid oxidation reaction. On the other hand, in (B), fuel is oxidized by temperature rise by compression, heat transfer from the engine and further temperature rise of a mixture (fuel and air) by heat exchange by mixing with EGR gas and its oxidation reaction progresses at a relatively low temperature than the production reaction of olefin, alkyl radicals. At this time, aldehyde is produced to appear as cold flame. A cold flame reaction is heat release reaction as heat release rate 37 shown in FIG. 4A, and temperature of a reaction field rises locally. CO and $H_2$ are generated by this temperature rise, then the reaction is shifted to a hot flame reaction to produce $CO_2$ and $H_2O$ and the combustion terminates. In the case where a cold flame reaction takes place, it is not limited to a specific place of the combustion chamber and to one place, so that the cold flame reaction proceeds at a plurality of places. Therefore, a lot of reaction places raised in temperature by the cold flame reaction exist, and ignition combustion occurs at a lot of points. Viewing from the entire combustion chamber, a distance of propagation of combustion flame occurred at one reaction place to an adjacent reaction place is very short, so that the combustion completes in a short time.

Figure 26:
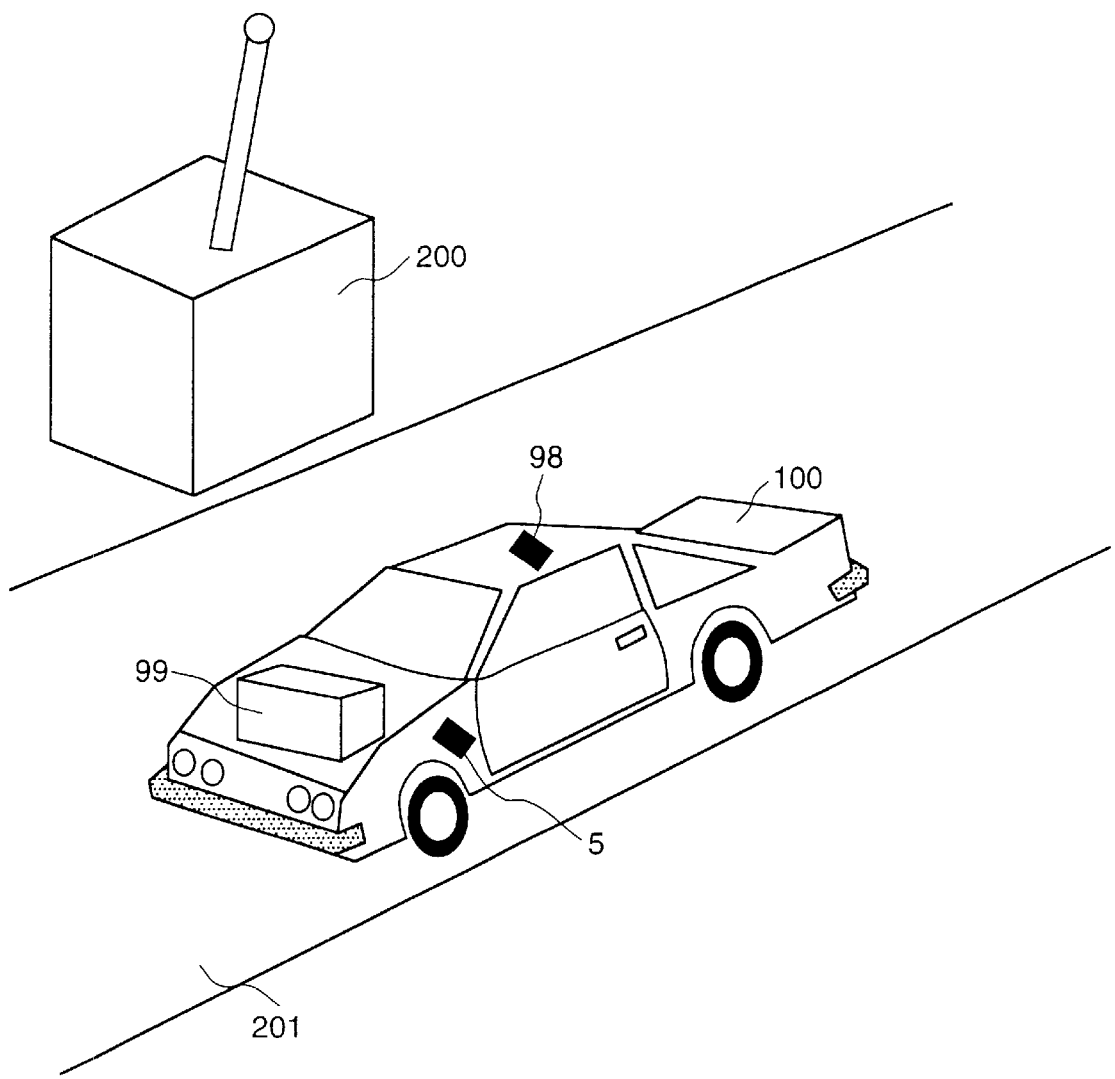
FIG. 26 is a perspective diagram of a fourth embodiment of the present invention.

FIG. 26 shows a control method of engine using road traffic information out of a vehicle as another embodiment of the present invention. Road traffic information systems supplying traffic jam information due to construction or traffic restriction of roads, occupation information of parking zones are being established,.and one of them imagined auto-cruising and running following a forward vehicle on a high way. On a high way 201 shown in FIG. 26, it is necessary to take a sufficient distance between vehicles for safety, however, it is desirable to shorten a distance between vehicles to run a lot of vehicles in view of effective use of roads. Therefore, the control 5 receives information of a forward side of the high way 201 used for running from a road traffic information supply equipment 200 installed around the high way 201, particularly, traffic jam information and vehicle distance information from forward vehicles, by a receiver 98 and controls the engine 99 using the information.

Figure 27:
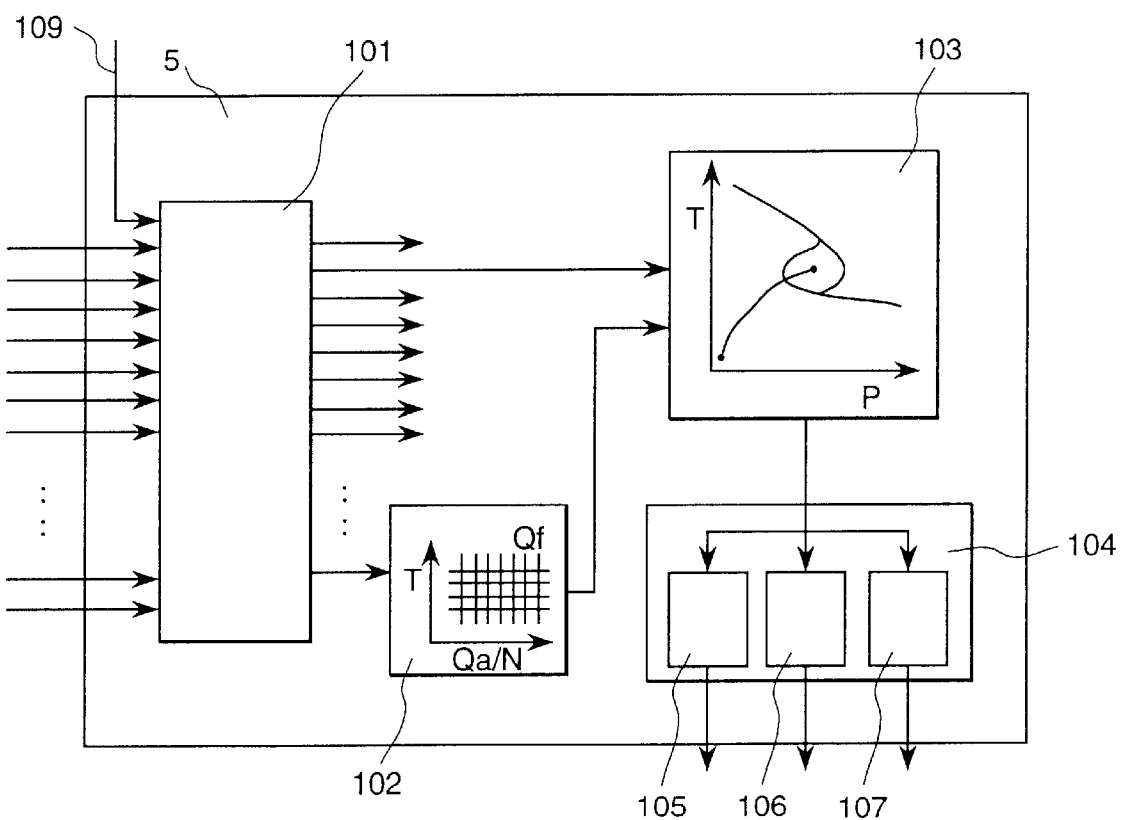
FIG. 27 is a block diagram of a control unit of the fourth embodiment of the present invention.

FIG. 27 shows a construction of control unit 5 in this case.

The construction has the construction shown in FIG. 21 made so that the feedback signal 108 is replaced by a signal 109 from the outside of a vehicle. As a signal 109 from the vehicle outside, mainly, traffic jam information and information of distance between the vehicle and forward vehicles are taken, and used for calculation of required engine torque at a time of auto-cruising in the operation state detecting means 101. At the time of auto-cruising, a driver does not operate an accelerator pedal, so that it is impossible to calculate the required engine torque from an operation quantity of accelerator pedal. In the case where the road at forward side has a space for enter of vehicles and there is no fear that the road becomes a jam of vehicles, the required engine torque is controlled so as to maintain a current vehicle speed or accelerate. On the other hand, in the case where information that vehicle distance from forward vehicles has become short because of a jam of vehicles on a forward side of the road is received from the road traffic information supply equipment 200, the required engine torque is made small so as to decrease a vehicle speed. The air fuel ratio setting means 102 sets an air fuel ratio, using the required engine torque calculated in this manner. Therefore, at the time of auto-cruising, an air fuel ratio is set according to the road traffic information input into the operation state detecting means 101, an EGR quantity, an operation quantity of the variable valve and a fuel injection method are adjusted and the engine cylinder-inside state is controlled.

Figure 28:
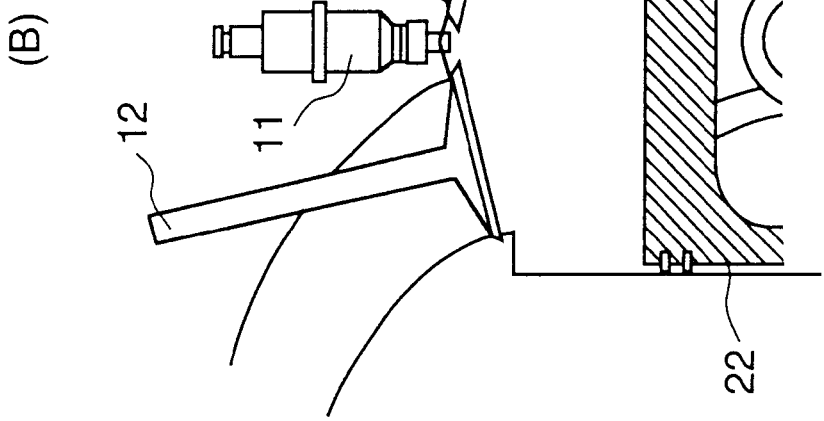
FIG. 28 is schematic views each showing an injection valve position of a direct injection engine.
Figure 28:
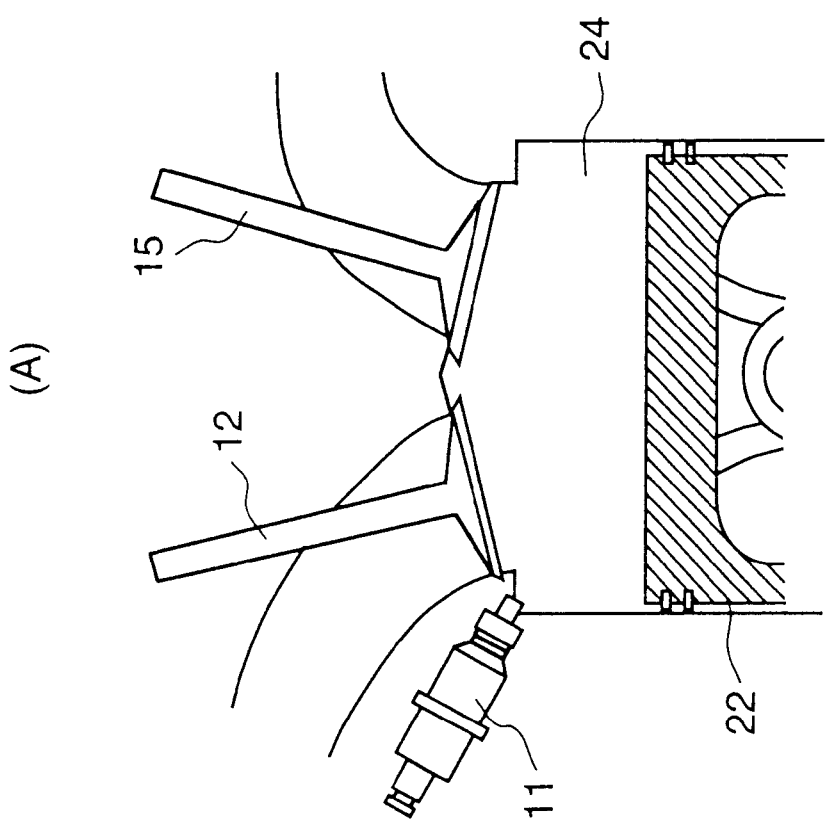

FIG. 28 shoes each construction of engines according to the present invention. FIG. 28 is sectional views of direct injection engines. (A) is an engine of side injection type in which a fuel injection valve 11 is mounted on a side of the combustion chamber 24. (B) is an engine of sensor injection type in which a fuel injection valve 11 is mounted at the center of the combustion chamber 24. The present invention can be applied to any type of the engines. Further, although a shape of the top end of the piston is desirable to be flat, the piston top can take a shape of a cavity or valve recess.

Figure 29A:
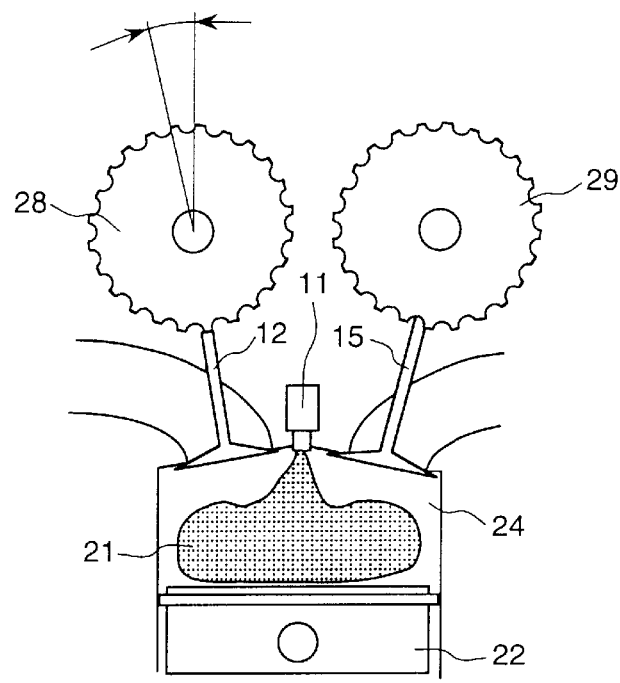
FIG. 29A is a schematic diagram of a phase difference type variable valve mechanism.
Figure 30A:
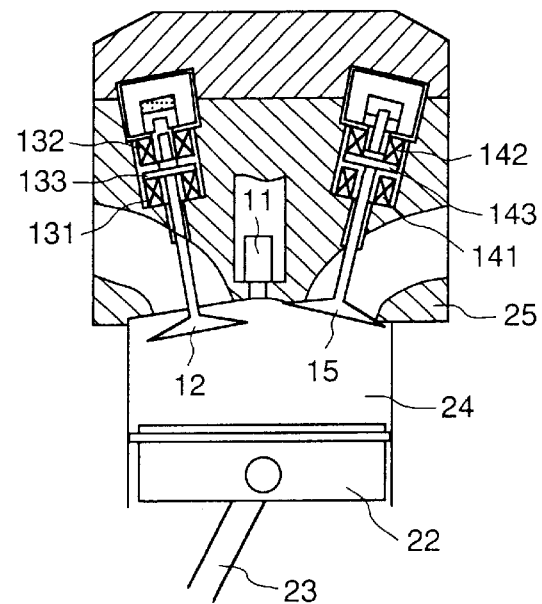
FIG. 30A is a schematic diagram of a electromagnetic valve mechanism.

FIG. 29A and 30A each show a variable valve mechanism used in the present invention. The intake valve and exhaust valve have the same operation, so that the intake valve is taken as an example and explained.

Figure 29B:
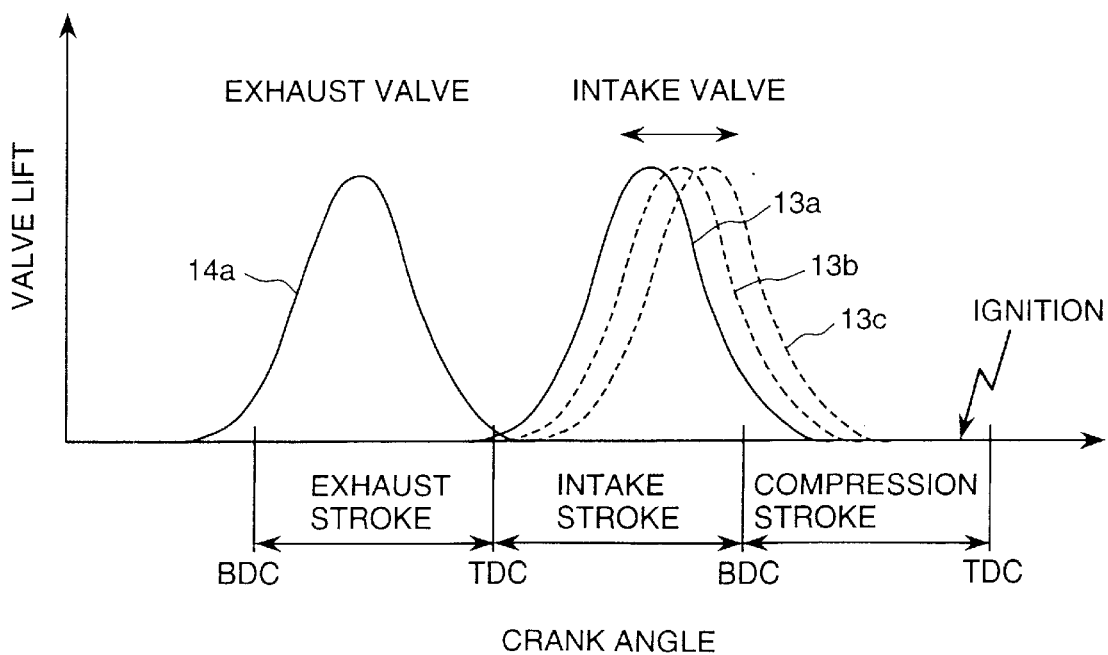
FIG. 29B is an illustration showing operation of the mechanism shown in FIG. 29A.

FIG. 29A shows a phase type variable valve mechanism, and the valve mechanism controls timing of opening and closing of the valve by changing a phase angle θ of a cam sprocket fixed to a cam shaft moving up and down the intake valve. In FIG. 29B, 13a denotes a valve lift curve when it operates with usual timing, 13b and 13c each denote a valve lift curve when opening and closing timing is delayed. Even when the valve opening timing is delayed, an influence of it to an intake air quantity is small, however, when the valve opening timing is delayed, air once taken in flows back, so that an intake air quantity become small. A compression ratio can be controlled by utilizing this phenomenon.

Figure 30B:
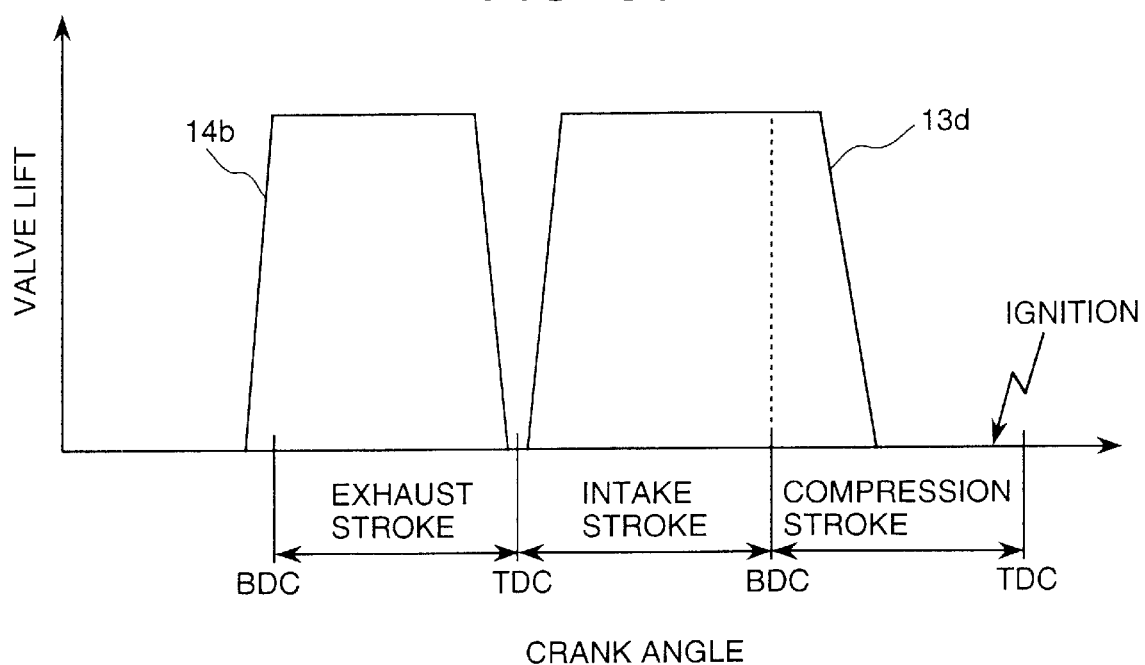
FIG. 30B is an illustration showing operation of the mechanism shown in FIG. 30A.

FIG. 30A shows an electromagnetic variable valve mechanism which comprises a movable element 133 fixed to the intake valve 12, and electromagnetic coils 131, 132. When current flows into the electromagnetic coil 131, electromagnetic force is generated, and attacts the movable element 133 to open the intake valve. On the contrary, when current flows into the electromagnetic coil 132, the intake valve is closed. A feature of the electromagnetic variable valve is to be short in time of opening and closing of the valve. The valve lift is shown by a curve in FIG. 30B. It also has a feature that valve opening timing and valve-closing timing can be controlled independently from each other. In this case, also, the compression ratio can be controlled by changing the valve closing timing.

Figure 31A:
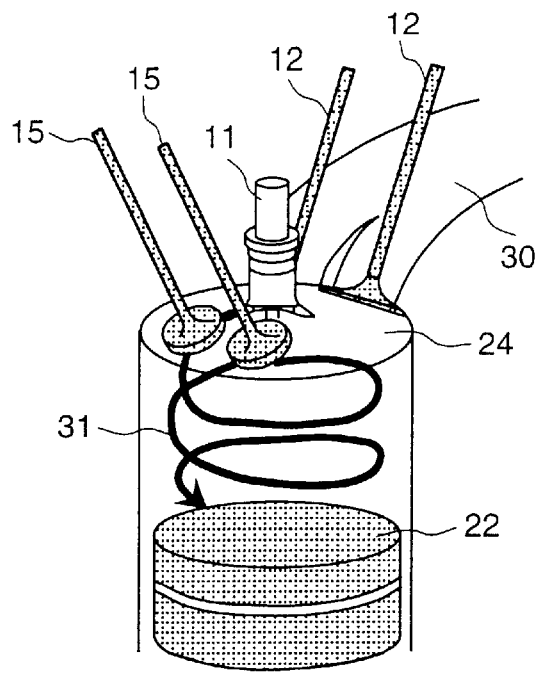
FIGS. 31A and 31B each are a schematic diagram showing an air flow or air flows inside a cylinder.
Figure 31B:
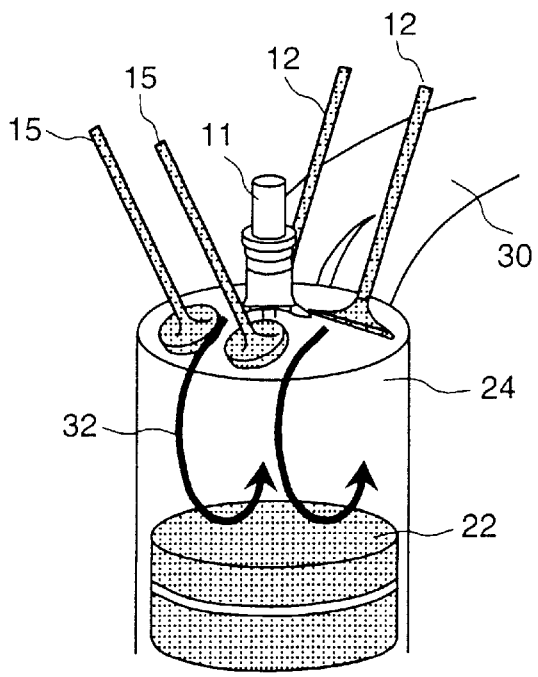

FIGS. 31A and 31B each show air flow motions used in the present invention. FIG. 31A is a perspective view from an intake port 30 of the engine to the combustion chamber 24, and shows a state in which while keeping one of the intake valves 12 close and air is taken only form the other intake passage, and horizontal swirl air flow motion 31 is generated in the combustion chamber 24. FIG. 31B shows a state in which two of the intake valves 12 are opened and vertical tumble air flow motions 32 are generated in the combustion chamber 24. It is important for the compression ignition engine of the present invention to homogeneous mixture, and to sufficiently agitate and mix air and fuel by using such air flow motions. Generally, in the swirl air flow motion, swirling motion remains even late in compression stroke in which the piston has risen, and the swirl air flow motion is not preferable for the compression ignition engine. In the tumble air flow motion, a space for vertically swirling late in compression stroke becomes zero and swirling eddies are broken, so that air flow motion becomes weak.

Therefore, it is desirable for the compression ignition engine to use the tumble air flow motion.

Figure 32A:
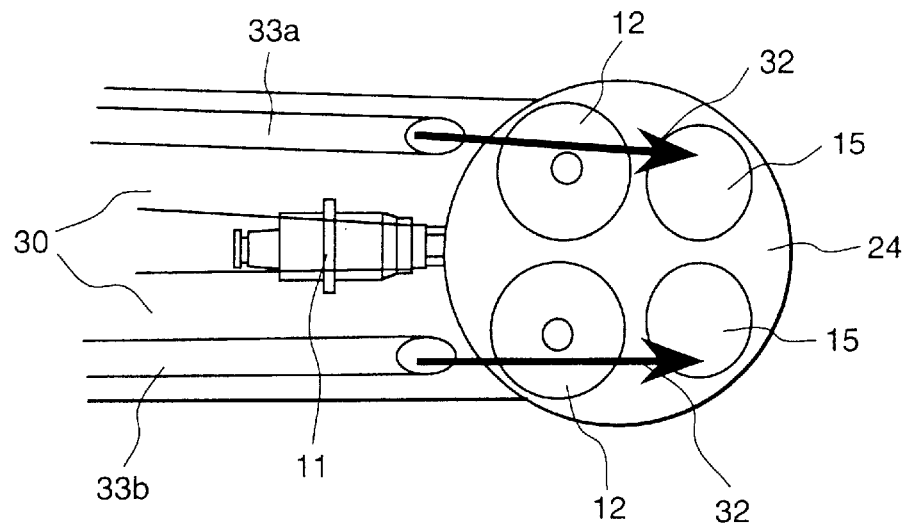
FIGS. 32A and 32B each are a view of a construction of auxiliary intake path forming tumble air flows.
Figure 32B:
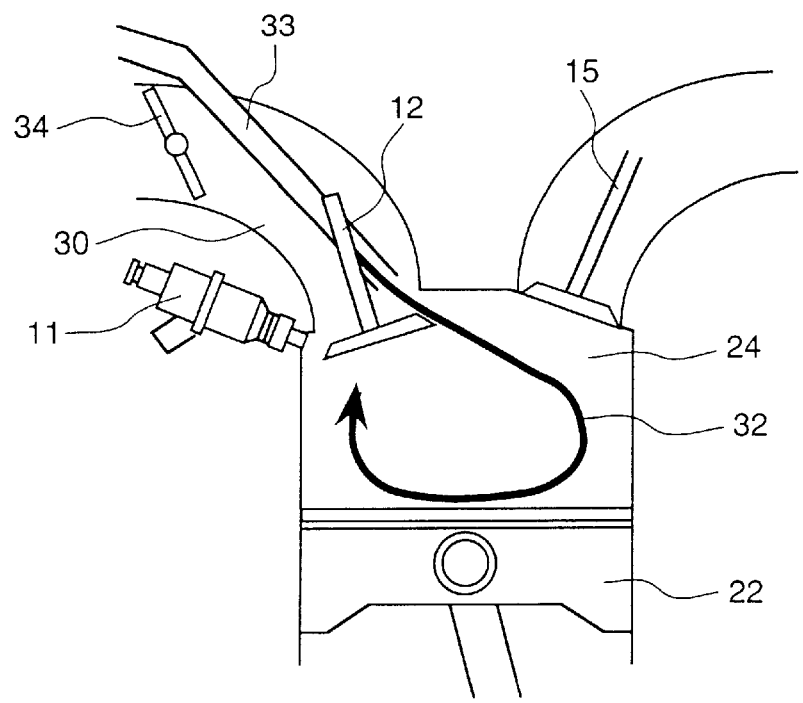

FIGS. 32A, 32B, 33A and 33B shows production method of tumble air flow motion. FIGS. 32A and 32B shows an example in which an auxiliary intake passage 33 is provided in the intake port 30. Air passes through the auxiliary air passage 33 by closing a flow-dividing valve 34 arranged in the intake port 30 and is taken in the combustion chamber 24. An inflow speed at this time has become faster than when the air has passed through the intake port 30, so that a directional air flow 32 is produced and comes to swirl inside the combustion chamber 24. The intensity of tumble air flow motion can be controlled by changing an opening of the flow-dividing valve 34. That is, the flow rate is changed by adjusting air flow rates flowing in the auxiliary air passage 33 and the intake port 30.

Figure 33A:
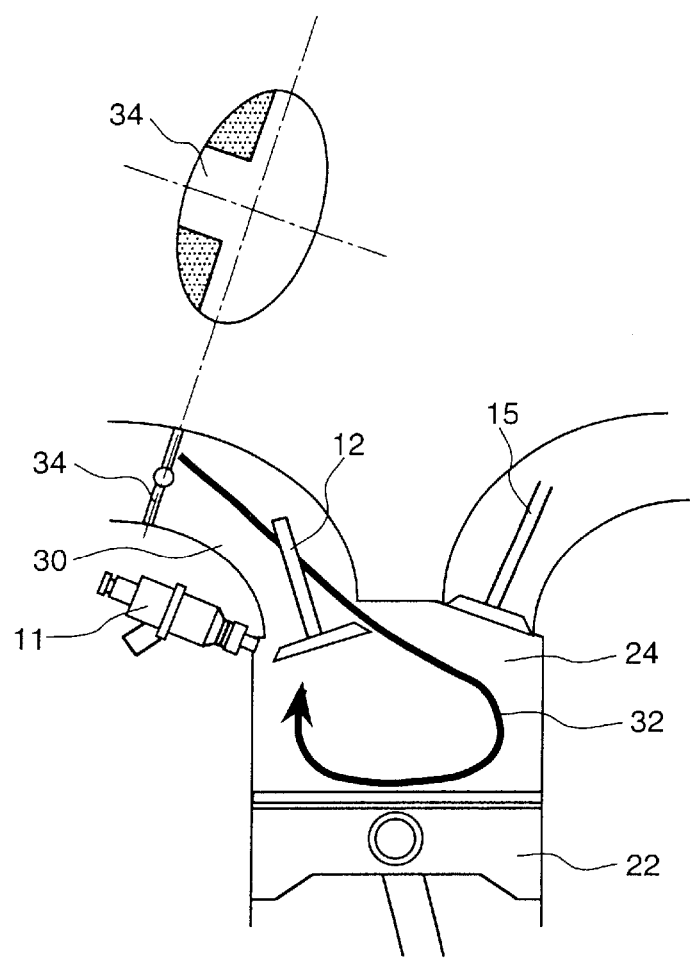
FIG. 33A is a schematic view of an engine construction having a TCV forming tumble air flows.
Figure 33B:
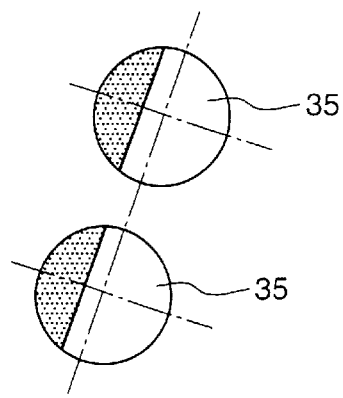
FIG. 33B is a view of TCVs.

FIGS. 33A and 33B shows an example in which a valve 34 (hereunder, called a tumble control valve (TCV)) with a notch is arranged in the intake port 30. Air passes through the notch portion of the TCV 34 by closing the TCV 34 and it is taken in the combustion chamber 24. At this time, the air mainly passes on the upper side of the intake valve 12, so that tumble air flow motion 32 is generated. Further, it is possible to control the intensity of the tumble air flow motion by changing an opening of the TCV 34. Further, in the case where the shape of the intake port 30 is independent, the TCV 34 is installed for each of the independent intake ports.

In the compression ignition engine according to the present invention, a cylinder-inside state after compression is estimated by using a cylinder-inside state quantity before combustion, whereby ignition timing is controlled so that ignition can be properly effected even at time of high torque. Concretely, opening and closing timing of the variable valve and an EGR quantity are controlled so that the cylinder-inside state (temperature or pressure) after compression becomes such a cylinder-inside state that cold flame which becomes a trigger of compression ignition phenomenon occurs. Thereby, it is possible to widely extend a combustion limit on the high torque side of the compression ignition engine.

What is claimed is:

1. A control method of a compression ignition engine in which a fuel-air mixture inside a cylinder is ignited by compression movement of the piston reciprocating inside the cylinder, comprising a control mechanism for controlling closing timing of an intake valve taking air into the cylinder, wherein said engine comprises a valve mechanism including an intake valve and an exhaust valve each incorporated with an engine cylinder, and a fuel injection valve having an injection port opened inside a combustion chamber surrounded by a piston and a cylinder wall of said engine, and in which a mixture of fuel injected from said fuel injection valve and air taken in said combustion chamber is ignited by compression due to reciprocation of said piston, wherein said compression ignition engine comprises:
operation state detecting means for detecting an operation state of said engine;
air fuel ratio setting means for setting an air fuel ratio;
cylinder-inside state estimating means for estimating temperature or pressure inside the cylinder; and
cylinder-inside state controlling means for controlling temperature or pressure inside the cylinder;
wherein said operation state detecting means judges the ignitability of fuel, and changes a cold flame region which becomes a target, on the basis of a judgement result.

2. A control method of a compression ignition engine in a vehicle in which a fuel-air mixture inside a cylinder is ignited by compression movement of the piston reciprocating inside the cylinder and in which a control mechanism for controlling closing timing of an intake valve taking air into the cylinder, said vehicle has a means for taking in road traffic information out of said vehicle; and wherein an air fuel ratio of the engine is set using said road traffic information.

3. A control method of a compression ignition engine in a vehicle in which a fuel-air mixture inside a cylinder is ignited by compression movement of the piston reciprocating inside the cylinder, wherein ignition timing is controlled by controlling a compression ratio, said vehicle has a means for taking in road traffic information out of said vehicle; and wherein an air fuel ratio of the engine is set using said road traffic information.

4. A control method of a compression ignition engine which comprises a valve mechanism including an intake valve and an exhaust valve each incorporated with an engine cylinder, and a fuel injection valve having an injection port opened inside a combustion chamber surrounded by a piston and a cylinder wall of said engine, and in which a mixture of fuel injected from said fuel injection valve and air taken in said combustion chamber is ignited by compression due to reciprocation of said piston, wherein said compression ignition engine comprises:
operation state detecting means for detecting an operation state of said engine;
air fuel ratio setting means for setting an air fuel ratio;
cylinder-inside state estimating means for estimating temperature or pressure inside the cylinder; and
cylinder-inside state controlling means for controlling temperature or pressure inside the cylinder;
wherein said air fuel ratio setting means sets an air fuel ratio, using at least one of detection results detected by said operation state detecting means;
said cylinder-inside state estimating means estimates a cylinder-inside temperature or pressure around a compression top dead center of said engine, using at least one of, detection results detected by said operation state detecting means and an air fuel ratio set by said air fuel setting means; and
said cylinder-inside state controlling means causes the cylinder-inside temperature or pressure in the vicinity of the compression top dead center to passe through a cold flame region which is an ignition range of fuel expressed by relations of temperature and pressure, based on the estimation results estimated by said cylinder-inside state estimating means.

5. A control method of a compression ignition engine, wherein a vehicle employing said control method according to claim 3, said vehicle has a means for taking in road traffic information out of said vehicle; and wherein an air fuel ratio of the engine is set using said road traffic information.

6. A control method of a compression ignition engine which comprises a valve mechanism including an intake valve and an exhaust valve each incorporated with an engine cylinder, and a fuel injection valve having an injection port opened inside a combustion chamber surrounded by a piston and a cylinder wall of said engine, and in which a mixture of fuel injected from said fuel injection valve and air taken in said combustion chamber is ignited by compression due to reciprocation of said piston, wherein said compression ignition engine comprises:
operation state detecting means for detecting an operation state of said engine;
air fuel ratio setting means for setting an air fuel ratio;
cylinder-inside state estimating means for estimating temperature or pressure inside the cylinder; and
cylinder-inside state controlling means for controlling temperature or pressure inside the cylinder;
wherein said air fuel ratio setting means sets an air fuel ratio, using at least one of detection results detected by said operation state detecting means;
said cylinder-inside state estimating means estimates a cylinder-inside temperature or pressure around a compression top dead center of said engine, using at least one of, detection results detected by said operation state detecting means and an air fuel ratio set by said air fuel setting means; and
said cylinder-inside state controlling means controls a quantity of EGR for heating air so that the cylinder-inside temperature or pressure in the vicinity of the compression top dead center passes through a cold flame region which is an ignition range of fuel expressed by relations of temperature and pressure, based on the estimation results estimated by said cylinder-inside state estimating means.

7. A control method of a compression ignition engine according to claim 6, wherein outer EGR is used as said cylinder-inside state controlling means.

8. A control method of a compression ignition engine according to claim 6, wherein inner EGR is used as said cylinder-inside state controlling means.

9. A control method of a compression ignition engine,
wherein a vehicle employing said control method according to claim 3, said vehicle has a means for taking in road traffic information out of said vehicle; and
wherein an air fuel ratio of the engine is set using said road traffic information.

10. A control method of a compression ignition engine which comprises a valve mechanism including an intake valve and an exhaust valve each incorporated with an engine cylinder, and a fuel injection valve having an injection port opened inside a combustion chamber surrounded by a piston and a cylinder wall of said engine, and in which a mixture of fuel injected from said fuel injection valve and air taken in said combustion chamber is ignited by compression due to reciprocation of said piston,
wherein said compression ignition engine comprises:
operation state detecting means for detecting an operation state of said engine;
air fuel ratio setting means for setting an air fuel ratio;
cylinder-inside state estimating means for estimating temperature or pressure inside the cylinder; and
cylinder-inside state controlling means for controlling temperature or pressure inside the cylinder;
wherein said air fuel ratio setting means sets an air fuel ratio, using at least one of detection results detected by said operation state detecting means;
said cylinder-inside state estimating means estimates a cylinder-inside temperature or pressure around a compression top dead center of said engine, using at least one of, detection results detected by said operation state detecting means and an air fuel ratio set by said air fuel setting means; and
said cylinder-inside state controlling means controls so as to inject a fuel quantity of 50% or less of a full fuel injection quantity during intake stroke and inject the remaining fuel quantity during compression stroke so that the cylinder-inside temperature or pressure in the vicinity of the compression top dead center passes through a cold flame region which is an ignition range of fuel expressed by relations of temperature and pressure, based on the estimation results estimated by said cylinder-inside state estimating means.

11. A control method of a compression ignition engine,
wherein a vehicle employing said control method according to claim 10, said vehicle has a means for taking in road traffic information out of said vehicle; and
wherein an air fuel ratio of the engine is set using said road traffic information.

12. A control method of a compression ignition engine which comprises a valve mechanism including an intake valve and an exhaust valve each incorporated with an engine cylinder, and a fuel injection valve having an injection port opened inside a combustion chamber surrounded by a piston and a cylinder wall of said engine, and in which a mixture of fuel injected from said fuel injection valve and air taken in said combustion chamber is ignited by compression due to reciprocation of said piston,
wherein said compression ignition engine comprises:
operation state detecting means for detecting an operation state of said engine;
air fuel ratio setting means for setting an air fuel ratio;
cylinder-inside state estimating means for estimating temperature or pressure inside the cylinder; and
cylinder-inside state controlling means for controlling temperature or pressure inside the cylinder;
wherein said air fuel ratio setting means sets an air fuel ratio, using at least one of detection results detected by said operation state detecting means;
said cylinder-inside state estimating means estimates a cylinder-inside temperature or pressure around a compression top dead center of said engine, using at least one of, detection results detected by said operation state detecting means and an air fuel ratio set by said air fuel setting means; and
said cylinder-inside state controlling means controls closing timing of an intake valve so that the cylinder-inside temperature or pressure in the vicinity of the compression top dead center passes through a cold flame region which is an ignition range of fuel expressed by relations of temperature and pressure, and that ignition takes place in the vicinity of the upper dead center of the engine, based on the estimation results estimated by said cylinder-inside state estimating means.

13. A control method of a compression ignition engine,
wherein a vehicle employing said control method according to claim 12, said vehicle has a means for taking in road traffic information out of said vehicle; and
wherein an air fuel ratio of the engine is set using said road traffic information.

* * * * *